(12) United States Patent
Yang et al.

(10) Patent No.: US 10,827,003 B2
(45) Date of Patent: Nov. 3, 2020

(54) APPLICATION DATA MIGRATION METHOD AND NETWORK DEVICE

(71) Applicant: Huawei Technologies Co., Ltd., Guangdong (CN)

(72) Inventors: Jiao Yang, Xi'an (CN); Yan Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/657,888

(22) Filed: Oct. 18, 2019

(65) Prior Publication Data

US 2020/0053167 A1 Feb. 13, 2020

Related U.S. Application Data

(63) Continuation of application No. PCT/CN2017/081502, filed on Apr. 21, 2017.

(51) Int. Cl.
*H04W 36/00* (2009.01)
*H04W 48/00* (2009.01)
(Continued)

(52) U.S. Cl.
CPC .......... *H04L 67/148* (2013.01); *G06F 9/4875* (2013.01); *G06F 9/5072* (2013.01);
(Continued)

(58) Field of Classification Search
CPC ..... H04W 36/00; H04W 24/10; H04W 56/00; H04W 48/00; H04W 60/00;
(Continued)

(56) References Cited

U.S. PATENT DOCUMENTS 9,357,464 B2 * 5/2016 Olofsson .......... H04W 36/0083
2009/0296737 A1 12/2009 Arye
(Continued)

FOREIGN PATENT DOCUMENTS

CN 101287283 A 10/2008
CN 103828323 A 5/2014
(Continued)

*Primary Examiner* — Tom Y Chang
(74) *Attorney, Agent, or Firm* — Womble Bond Dickinson (US) LLP

(57) ABSTRACT

Embodiments of this application provide an application data migration method, including: obtaining, by a network device, a first, second, and third parameter, where the first parameter includes a delay in communication between a terminal device and a first server through a first connection, the second parameter includes a delay in communication between the terminal device and a second server through a second connection, and the third parameter includes a time for synchronizing a context between the first server and the second server; and if the first parameter is greater than a sum of the second parameter and the third parameter, determining, by the network device, that application data on the terminal device needs to be migrated from the first connection to the second connection; otherwise, determining, by the network device, that application data does not need to be migrated from the first connection to the second connection.

20 Claims, 21 Drawing Sheets

(51) Int. Cl.
  *G06F 9/48* (2006.01)
  *H04L 29/08* (2006.01)
  *G06F 9/50* (2006.01)
  *H04W 56/00* (2009.01)
  *H04W 60/00* (2009.01)

(52) U.S. Cl.
  CPC ..... *H04L 67/1008* (2013.01); *H04W 36/0016* (2013.01); *H04W 36/0033* (2013.01); *H04W 36/0083* (2013.01); *H04W 48/00* (2013.01); *H04W 56/00* (2013.01); *H04W 60/00* (2013.01)

(58) Field of Classification Search
  CPC ......... H04W 36/0033; H04W 36/0083; H04W 36/0085; H04W 36/0016; H04W 36/0022; H04W 36/08; H04W 36/24; H04W 56/001
  See application file for complete search history.

(56) References Cited

U.S. PATENT DOCUMENTS

| | | | |
|---|---|---|---|
| 2010/0309883 A1* | 12/2010 | Nagasawa | H04W 36/30 370/331 |
| 2013/0031256 A1 | 1/2013 | Hampel | |
| 2013/0094523 A1* | 4/2013 | Shen | H04J 3/0658 370/503 |
| 2013/0344918 A1* | 12/2013 | Tat | H04W 88/06 455/558 |
| 2014/0087729 A1* | 3/2014 | Olofsson | H04W 36/245 455/436 |
| 2014/0359616 A1 | 12/2014 | Nakashima et al. | |
| 2015/0126193 A1* | 5/2015 | Huang | H04W 36/0083 455/436 |
| 2017/0347295 A1* | 11/2017 | Rune | H04W 36/0033 |
| 2017/0353896 A1* | 12/2017 | Nath | H04W 36/00837 |
| 2019/0028985 A1* | 1/2019 | Wang | H04W 56/001 |
| 2019/0053107 A1* | 2/2019 | Fu | H04W 36/0033 |
| 2019/0141590 A1* | 5/2019 | Li | H04B 1/711 |
| 2019/0289499 A1 | 9/2019 | Xia et al. | |
| 2020/0068451 A1* | 2/2020 | Mihály | H04W 36/0022 |

FOREIGN PATENT DOCUMENTS

| | | |
|---|---|---|
| CN | 104486361 A | 4/2015 |
| CN | 104954321 A | 9/2015 |
| CN | 106453840 A | 2/2017 |
| WO | 2015180097 A1 | 12/2015 |
| WO | 2016101974 A1 | 6/2016 |

\* cited by examiner

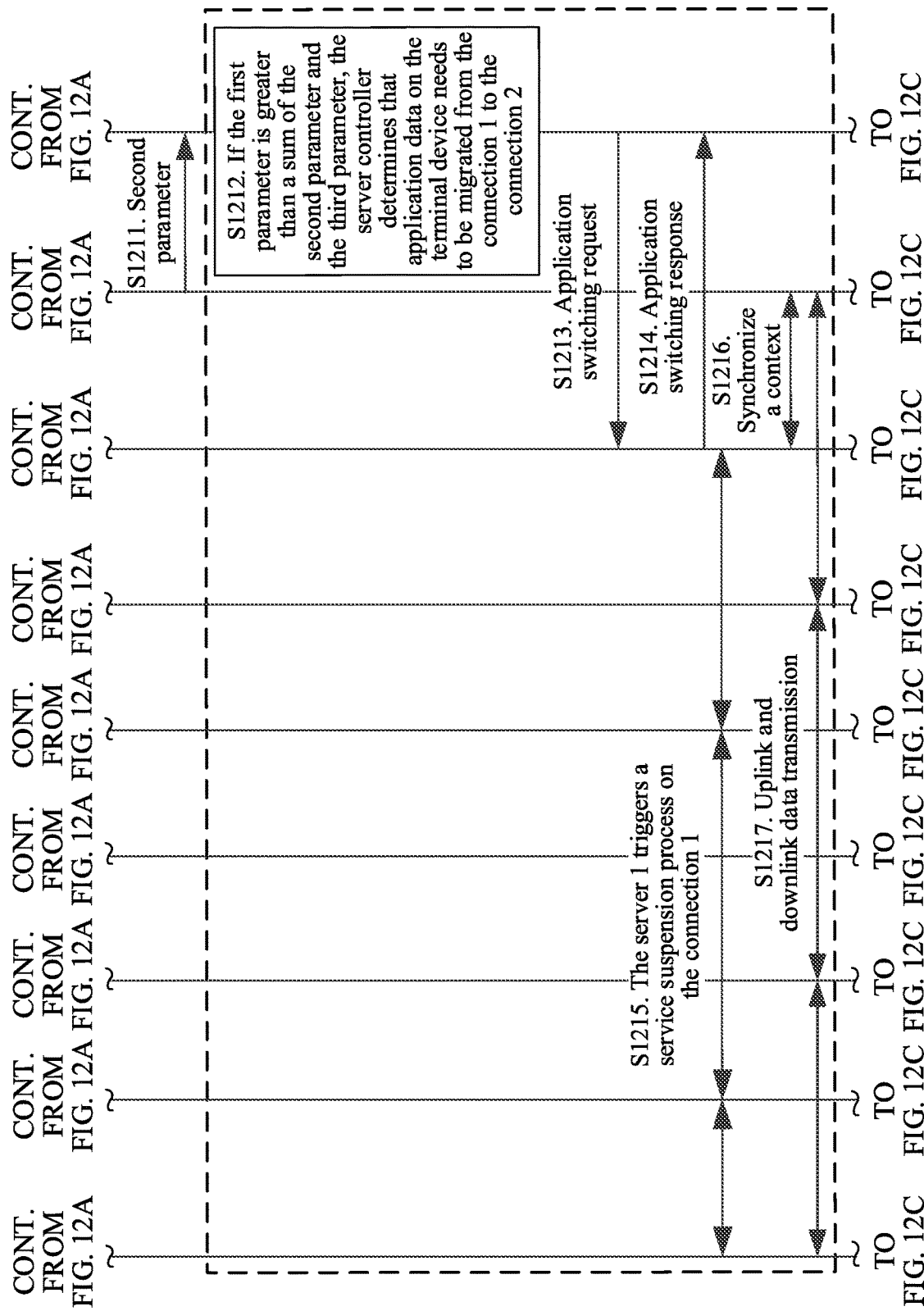

APPLICATION DATA MIGRATION METHOD AND NETWORK DEVICE

CROSS-REFERENCE TO RELATED APPLICATIONS

This application is a continuation of International Application No. PCT/CN2017/081502, filed on Apr. 21, 2017, the disclosure of which is incorporated herein by reference in its entirety.

TECHNICAL FIELD

This application relates to the field of wireless communications technologies, and in particular, to an application data migration method and a network device.

BACKGROUND

Currently, when a terminal device moves, the terminal device may need to establish a new communication path, so that new application data on the terminal device is transmitted through the communication path. For original application data that exists before the terminal device moves, the terminal device migrates all of the original application data to the new communication path, or retains all of the original application data on an original communication path. For example, as shown in FIG. 1, before the terminal device moves, the terminal device accesses a domain name A, and a domain name system (DNS) server parses the domain name A into an internet protocol (IP) address IP 1, and returns IP 1 to the terminal device. The terminal device uses IP 3 allocated by a control plane (CP) function entity to access a server 1 corresponding to IP 1.

After the terminal device moves, the CP function entity allocates IP 4 to the terminal device. The DNS server parses the domain name A into IP 2, and returns IP 2 to the terminal device, and the terminal device uses IP 4 to access a server 2 corresponding to IP 2. In this case, as shown in FIG. 1, the original application data is migrated from a path 1 to a path 2.

However, such a migration mechanism in which the original application data is all migrated or not migrated may degrade communication quality, and may cause a waste of network resources. Therefore, how to provide an optimal communication path for the original application data after the terminal device moves is an urgent problem to be resolved.

SUMMARY

Embodiments of this application provide an application data migration method and a network device, so as to provide an optimal communication path for original application data after a terminal device moves.

To achieve the foregoing objective, the following technical solutions are used in the embodiments of this application.

According to a first aspect, an application data migration method is provided, and the method includes:

obtaining, by a network device, a first parameter, a second parameter, and a third parameter, where the first parameter includes a delay in communication between a terminal device and a first server through a first connection, the second parameter includes a delay in communication between the terminal device and a second server through a second connection, and the third parameter includes a time for synchronizing a context between the first server and the second server; and if the first parameter is greater than a sum of the second parameter and the third parameter, determining, by the network device, that application data on the terminal device needs to be migrated from the first connection to the second connection; or if the first parameter is not greater than a sum of the second parameter and the third parameter, determining, by the network device, that the application data does not need to be migrated from the first connection to the second connection. In other words, a migration determining mechanism is introduced in the application data migration method provided in this embodiment of this application. During migration determining, the network device performs determining based on the delay in communication between the terminal device and the first server through the first connection, the delay in communication between the terminal device and the second server through the second connection, and the time for synchronizing the context between the first server and the second server; and when the delay in communication between the terminal device and the first server through the first connection is greater than a sum of the delay in communication between the terminal device and the second server through the second connection and the time for synchronizing the context between the first server and the second server, the network device determines that the application data on the terminal device needs to be migrated from the first connection to the second connection; otherwise, the network device determines that the application data does not need to be migrated from the first connection to the second connection. In this way, the following problem in the prior art is avoided: when the terminal device moves, original application data on the terminal device may be all migrated or not migrated, which may degrade communication quality, and cause a waste of network resources. Therefore, according to the application data migration method provided in this embodiment of this application, after the terminal device moves, an optimal communication path is provided for the original application data, thereby saving network resources and improving communication efficiency.

In one embodiment, the network device is the first server; and the obtaining, by a network device, a third parameter includes: receiving, by the first server, the third parameter from the second server. In the application data migration method provided in this embodiment of this application, migration determining is performed by the first server. During the migration determining, the first server performs determining based on the delay in communication between the terminal device and the first server through the first connection, the delay in communication between the terminal device and the second server through the second connection, and the time for synchronizing the context between the first server and the second server; and when the delay in communication between the terminal device and the first server through the connection 1 is greater than a sum of the delay in communication between the terminal device and the second server through the connection 2 and the time for synchronizing the context between the first server and the second server, the first server determines that the application data on the terminal device needs to be migrated from the connection 1 to the connection 2; otherwise, the first server determines that the application data does not need to be migrated from the connection 1 to the connection 2. Therefore, after the terminal device moves, an optimal communication path is provided for the original application data, thereby saving network resources and improving communication efficiency.

In one embodiment, the obtaining, by a network device, a second parameter includes: obtaining, by the first server, a delay estimation value for communication between the terminal device and a server through an established connection, and determining the delay estimation value as the second parameter; or receiving, by the first server, the second parameter from the terminal device.

In one embodiment, the network device is the second server; and the obtaining, by a network device, a third parameter includes: receiving, by the second server, the third parameter from the first server. In the application data migration method provided in this embodiment of this application, migration determining is performed by the second server. During the migration determining, the second server performs determining based on a delay in communication between the terminal device and the first server through a connection 1, a delay in communication between the terminal device and the second server through a connection 2, and a time for synchronizing a context between the first server and the second server; and when the delay in communication between the terminal device and the first server through the connection 1 is greater than a sum of the delay in communication between the terminal device and the second server through the connection 2 and the time for synchronizing the context between the first server and the second server, the second server determines that the application data on the terminal device needs to be migrated from the connection 1 to the connection 2; otherwise, the second server determines that the application data does not need to be migrated from the connection 1 to the connection 2. Therefore, after the terminal device moves, an optimal communication path is provided for the original application data, thereby saving network resources and improving communication efficiency.

In one embodiment, the obtaining, by a network device, a second parameter includes: obtaining, by the second server, a delay estimation value for communication between the terminal device and a server through an established connection, and determining the delay estimation value as the second parameter; or determining, by the second server, the second parameter.

In one embodiment, the network device is a server controller; and the obtaining, by a network device, a third parameter includes: receiving, by the server controller, the third parameter from the first server or the second server. In the application data migration method provided in this embodiment of this application, migration determining is performed by the server controller. During the migration determining, the server controller performs determining based on a delay in communication between the terminal device and the first server through a connection 1, a delay in communication between the terminal device and the second server through a connection 2, and a time for synchronizing a context between the first server and the second server; and when the delay in communication between the terminal device and the first server through the connection 1 is greater than a sum of the delay in communication between the terminal device and the second server through the connection 2 and the time for synchronizing the context between the first server and the second server, the server controller determines that the application data on the terminal device needs to be migrated from the connection 1 to the connection 2; otherwise, the server controller determines that the application data does not need to be migrated from the connection 1 to the connection 2. Therefore, after the terminal device moves, an optimal communication path is provided for the original application data, thereby saving network resources and improving communication efficiency.

In one embodiment, the obtaining, by a network device, a second parameter includes: obtaining, by the server controller, a delay estimation value for communication between the terminal device and a server through an established connection, and determining the delay estimation value as the second parameter; or receiving, by the server controller, the second parameter from the second server.

In one embodiment, if the network device determines that the application data needs to be migrated from the first connection to the second connection, the method further includes: sending, by the network device, a handover indication message to the first server, where the handover indication message is used to instruct the first server to migrate the application data from the first connection to the second connection.

In one embodiment, before the terminal device establishes the second connection, the method further includes: determining, by the network device, that the first parameter exceeds a preset value. In this way, when the first parameter does not exceed the preset value, the application data usually does not need to be migrated. Therefore, the network device establishes the second connection only after the network device determines that the first parameter exceeds the preset value, so that unnecessary connection establishment processes are reduced, and system resources are saved.

In one embodiment, if the network device determines that the application data does not need to be migrated from the first connection to the second connection, the method further includes: transmitting, by the network device, the application data through the first connection; or releasing, by the network device, the first connection.

In one embodiment, before the network device transmits the application data through the first connection, or before the network device releases the first connection, the method further includes: determining, by the network device, whether the first parameter exceeds a maximum delay allowed for the first connection; and if the network device determines that the first parameter exceeds the maximum delay allowed for the first connection, releasing, by the network device, the first connection; or if the network device determines that the first parameter does not exceed the maximum delay allowed for the first connection, transmitting, by the network device, the application data through the first connection. In this way, the network device transmits the application data through the first connection only when the network device determines that the first parameter does not exceed the maximum delay allowed for the first connection, thereby avoiding a problem that the application data fails to be transmitted because the first parameter exceeds the maximum delay allowed for the first connection, and improving transmission reliability of the application data.

According to a second aspect, an embodiment of this application provides a network device. The network device includes an obtaining module and a determining module, where the obtaining module is configured to obtain a first parameter, a second parameter, and a third parameter, where the first parameter includes a delay in communication between a terminal device and a first server through a first connection, the second parameter includes a delay in communication between the terminal device and a second server through a second connection, and the third parameter includes a time for synchronizing a context between the first server and the second server; the determining module is configured to: if the first parameter is greater than a sum of the second parameter and the third parameter, determine that application data on the terminal device needs to be migrated from the first connection to the second connection; and the determining module is further configured to: if the first parameter is not greater than a sum of the second parameter and the third parameter, determine that the application data does not need to be migrated from the first connection to the second connection. In other words, a migration determining mechanism is introduced in the network device provided in this embodiment of this application. During migration determining, the network device performs determining based on the delay in communication between the terminal device and the first server through the first connection, the delay in communication between the terminal device and the second server through the second connection, and the time for synchronizing the context between the first server and the second server; and when the delay in communication between the terminal device and the first server through the first connection is greater than a sum of the delay in communication between the terminal device and the second server through the second connection and the time for synchronizing the context between the first server and the second server, the network device determines that the application data on the terminal device needs to be migrated from the first connection to the second connection; otherwise, the network device determines that the application data does not need to be migrated from the first connection to the second connection. In this way, the following problem in the prior art is avoided: when the terminal device moves, original application data on the terminal device may be all migrated or not migrated, which may degrade communication quality, and cause a waste of network resources. Therefore, according to the network device provided in this embodiment of this application, after the terminal device moves, an optimal communication path is provided for the original application data, thereby saving network resources and improving communication efficiency.

In one embodiment, the network device is the first server; and the obtaining module is specifically configured to receive the third parameter from the second server.

In one embodiment, the second server may obtain the third parameter in the following manner: the second server receives a request message from the first server, where the request message carries time stamp information and a size of a to-be-synchronized context, and is used to request the third parameter; and then, the second server determines a network transmission time of the context based on the time stamp information, determines, based on the size of the context, a time for processing the to-be-synchronized context by the second server, and adds the network transmission time and the time for processing the context, to obtain the time for synchronizing the context between the first server and the second server, namely, the third parameter.

In one embodiment, the obtaining module is further specifically configured to: obtain a delay estimation value for communication between the terminal device and a server through an established connection, and determine the delay estimation value as the second parameter; or receive the second parameter from the terminal device.

In one embodiment, the network device is the second server; and the obtaining module is specifically configured to receive the third parameter from the first server.

In one embodiment, the first server may obtain the third parameter in the following manner: the first server receives a request message from the second server, where the request message carries time stamp information and a size of a to-be-synchronized context, and is used to request the third parameter; and then, the first server determines a network transmission time of the context based on the time stamp information, determines, based on the size of the context, a time for processing the to-be-synchronized context by the first server, and adds the network transmission time and the time for processing the context, to obtain the time for synchronizing the context between the first server and the second server, namely, the third parameter.

In one embodiment, the obtaining module is further specifically configured to: obtain a delay estimation value for communication between the terminal device and a server through an established connection, and determine the delay estimation value as the second parameter; or determine the second parameter.

In one embodiment, the network device is a server controller; and the obtaining module is specifically configured to receive the third parameter from the first server or the second server.

In one embodiment, the obtaining module is further specifically configured to: obtain a delay estimation value for communication between the terminal device and a server through an established connection, and determine the delay estimation value as the second parameter; or receive the second parameter from the second server.

In one embodiment, the network device further includes a transceiver module, where the transceiver module is configured to: if the determining module determines that the application data needs to be migrated from the first connection to the second connection, send a handover indication message to the first server, where the handover indication message is used to instruct the first server to migrate the application data from the first connection to the second connection.

In one embodiment, the determining module is further configured to determine that the first parameter exceeds a preset value.

In one embodiment, the first network device further includes a transceiver module, where the transceiver module is configured to: if the determining module determines that the application data does not need to be migrated from the first connection to the second connection, transmit the application data through the first connection.

In one embodiment, the first network device further includes a releasing module, where the releasing module is configured to: if the determining module determines that the application data does not need to be migrated from the first connection to the second connection, release the first connection.

In one embodiment, the determining module is further configured to: before the transceiver module transmits the application data through the first connection, or before the releasing module releases the first connection, determine whether the first parameter exceeds a maximum delay allowed for the first connection; and the transceiver module is specifically configured to: if the determining module determines that the first parameter does not exceed the maximum delay allowed for the first connection, transmit the application data through the first connection; and the releasing module is specifically configured to: if the determining module determines that the first parameter exceeds the maximum delay allowed for the first connection, release the first connection.

According to a third aspect, an embodiment of this application provides a network device, including: a processor, a memory, a bus, and a communications interface, where the memory is configured to store a computer executable instruction; the processor is connected to the memory by using the bus; and when the network device runs, the processor executes the computer executable instruction stored in the memory, and the network device is enabled to perform the application data migration method in any design of the first aspect.

According to a fourth aspect, an embodiment of this application provides a computer readable storage medium, configured to store a computer software instruction used by the foregoing network device. When the computer software instruction is run on a computer, the computer is enabled to perform the application data migration method in any design of the first aspect.

According to a fifth aspect, an embodiment of this application provides a computer program product that includes an instruction. When the computer program product runs on a computer, the computer is enabled to perform the application data migration method in any design of the first aspect.

For technical effects brought by any design manner in the second aspect to the fifth aspect, refer to technical effects brought by the different design manners in the first aspect. Details are not described herein again.

BRIEF DESCRIPTION OF DRAWINGS

FIG. 12A, FIG. 12B, and FIG. 12C are a schematic interaction diagram 6 of an application data migration method according to an embodiment of this application;

DESCRIPTION OF EMBODIMENTS

For ease of understanding technical solutions of embodiments of this application, the following first briefly describes technologies related to this application.

1. Media Independent Handover (MIH) Technology

The MIH technology provides a method for providing link layer information and other related network information for an upper layer. The technology can be used for handover between heterogeneous networks. An independent MIH layer is added between Layer 2 (data link layer) and Layer 3 (network layer), so that data link layer information can be obtained, to trigger handover between heterogeneous networks in advance. For example, the link layer information may include transmission behavior on a data link at Layer 2.

MIH provides the following types of services:

(1) Event Service

The event service can provide a status of a current network and transmission behavior on a data link at Layer 2.

(2) Command Service

The command service provides different commands for a higher layer, to implement control of a higher layer over a lower layer (for example, Layer 3 (network layer) to the MIH layer, the MIH layer to Layer 2 (data link layer), and Layer 2 (data link layer) to Layer 1 (physical layer)).

(3) Information Service

The information service provides a framework and a communication mechanism. Information about an existing network within a geographical range may be detected and obtained by using an MIH function entity that implements functions of the MIH layer, thereby facilitating a handover process. The information service mainly provides a set of request or response mechanism used for information transfer. The information service provides static information (for example, neighbor location information that helps in network discovery), and further provides dynamic information (for example, information that helps optimize link layer connectivity in a heterogeneous network). The information service may include link layer parameters, such as channel information, a media access control (MAC) address, and security information.

In addition, the MIH technology further defines an MIH registration process. MIH registration allows a terminal device to select one network node from a plurality of optional network control nodes, which is an important mechanism of network control. For a specific MIH registration process, refer to an existing MIH protocol, and details are not described herein.

2. Packet data unit (PDU) session establishment process

Figure 1:
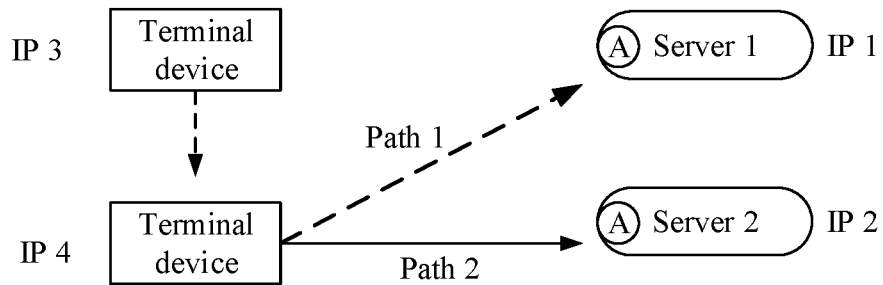
FIG. 1 is a schematic diagram of migrating application data in the prior art.
Figure 2:
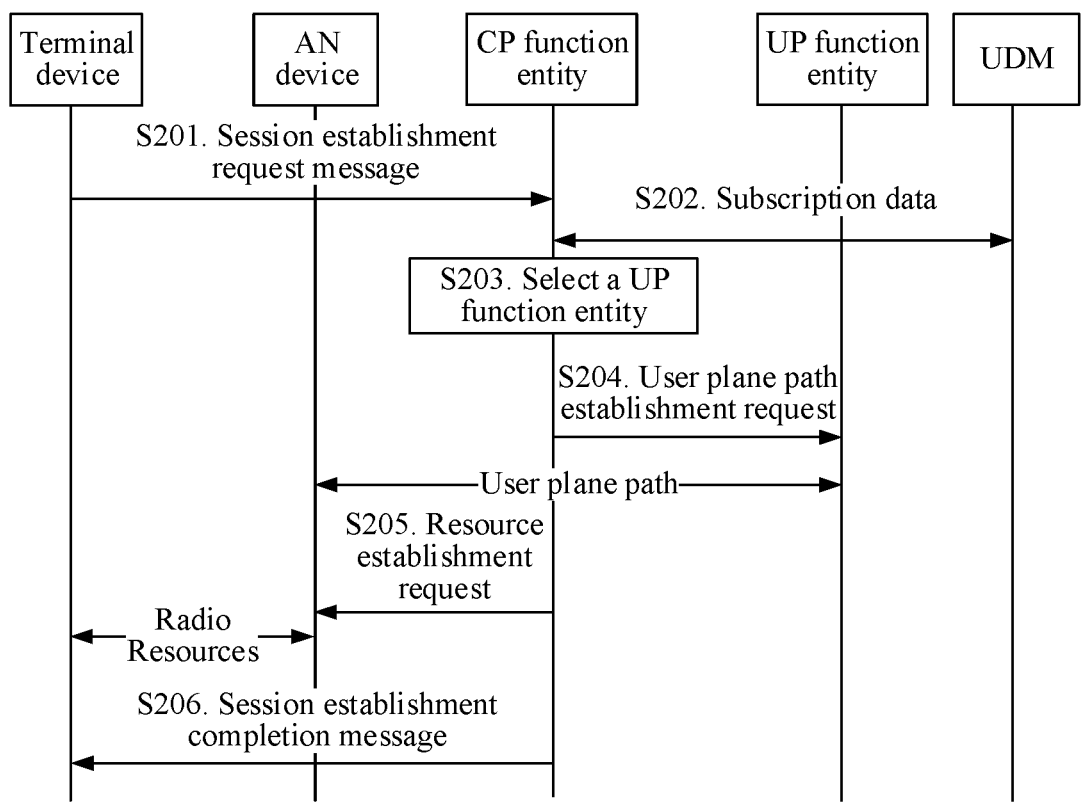
FIG. 2 is a schematic flowchart of establishing a packet data unit (PDU) session in the prior art.

FIG. 2 is a schematic flowchart of establishing a PDU session in the prior art. The following steps are included.

S201. A terminal device sends a session establishment request message to a CP function entity by using an access network (AN) device. The session establishment request message is used to request to establish a PDU session.

For example, the session establishment request message may carry a PDU type and a data network name. The PDU type is used to indicate a type of the PDU session, and the data network name is used to indicate a data network to be accessed by the terminal device.

S202. The CP function entity interacts with a unified data management (UDM) module, to obtain session management-related subscription data from the UDM module. The UDM module has a function of storing the subscription data. Certainly, the UDM may have another name. This is not limited in this embodiment of this application.

For example, the subscription data may include a granted PDU type, a granted session and service continuity (SSC) mode, and a default quality of service (QoS) description file.

S203. The CP function entity selects a proper user plane (UP) function entity.

For example, the CP function entity selects the proper UP function entity based on the obtained subscription data.

S204. The CP function entity sends a user plane path establishment request message to the UP function entity. The user plane path establishment request message triggers establishment of a user plane path between the AN device and the UP function entity.

Certainly, after the user plane path between the AN device and the UP function entity is established, the UP function entity may further send a user plane path establishment completion message to the CP function entity. This is not specifically limited in this embodiment of this application.

S205. The CP function entity sends a resource establishment request message to the AN device. The resource establishment request message triggers establishment of radio resources between the AN device and the terminal device.

Certainly, after the radio resources are established between the AN device and the terminal device, the AN device may further send a resource establishment completion message to the CP function entity. This is not specifically limited in this embodiment of this application.

S206. The CP function entity sends a session establishment completion message to the terminal device by using the AN device. The session establishment completion message is used to indicate that the PDU session is established.

After the PDU session is established, uplink and downlink data can be transmitted between the terminal device and each of the AN device and the UP function entity.

3. Transmission Control Protocol (TCP)

TCP is a connection-oriented, reliable, and byte stream-based transport layer communications protocol. To ensure reliability of packet transmission, TCP allocates a sequence number to each packet. In addition, the sequence number ensures that packets to be transmitted to a receive end entity are to be received in sequence. Then, the receive end entity feeds back an acknowledgment (ACK) based on successfully received bytes. If a transmit end entity does not receive any acknowledgement within a proper round-trip time (RTT), corresponding data (assumed to be lost) will be retransmitted. To establish a connection, TCP uses either a three-way handshake or a four-way handshake. For details, refer to an existing TCP connection implementation, and the details are not described herein.

4. Multipath TCP (MPTCP)

In a standard TCP protocol, each connection uses only one path for transmission. However, in a new mobile Internet environment, different radio access technologies are integrated. A terminal device has a plurality of network interfaces such as a wireless fidelity (WiFi) interface and a cellular network interface. In this case, there are a plurality of available paths between two terminals that communicate with each other. If only one path is used according to the standard TCP protocol, other path resources are wasted. In addition, an increasing quantity of applications on a current terminal device need to access the Internet. If these applications can simultaneously access the Internet by using a plurality of paths on different interfaces, higher-level user experience can be ensured, and impact of characteristics such as a link change and a high bit error rate on a wireless network is reduced.

Figure 3:
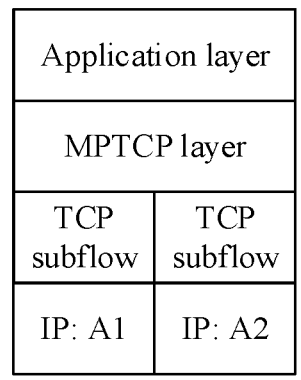
FIG. 3 is a schematic architectural diagram of a multipath transmission control protocol (MPTCP) in the prior art.

As shown in FIG. 3, a core idea of MPTCP is to add an MPTCP layer supporting multipath transmission between an application layer and a transport layer, so that conventional TCP data is transmitted on a plurality of TCP subflows. Different TCP subflows are transmitted through different paths, and are aggregated at a terminal device. An original TCP layer is effective only for a TCP subflow in an MPTCP protocol, so that the MPTCP protocol can be compatible with the original TCP protocol, and the MPTCP layer is transparent to other layers in a network, and a great change to the network is not required.

Figure 4:
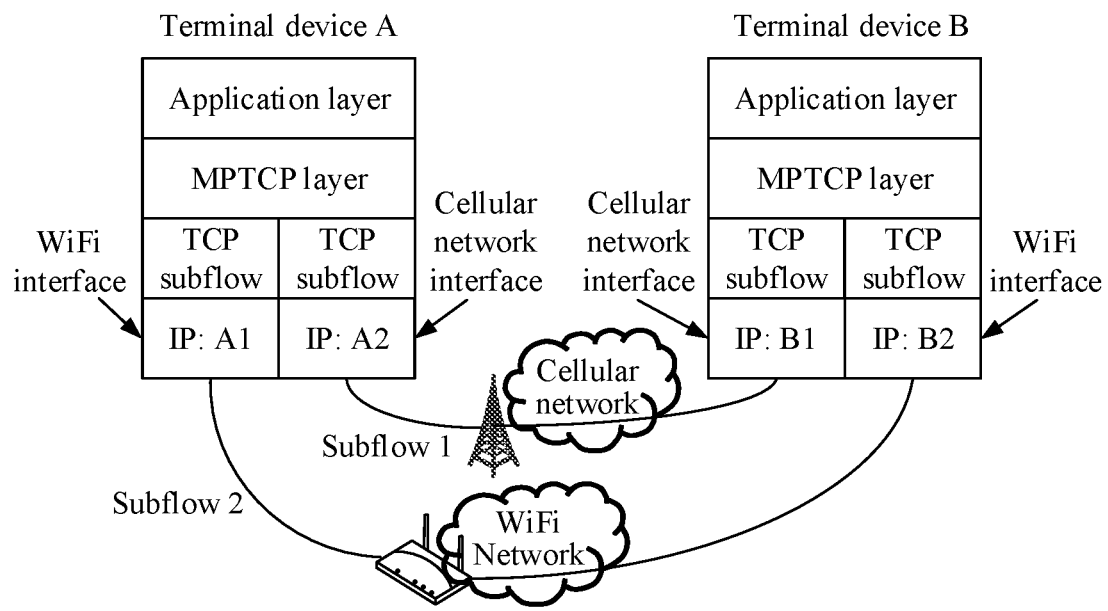
FIG. 4 is a schematic diagram of a typical application scenario of MPTCP in the prior art.

FIG. 4 shows a typical application scenario of MPTCP. A terminal device A and a terminal device B are two terminal devices that communicate with each other and that each have a plurality of interfaces (including a WiFi interface and a cellular network interface). IP addresses of the interfaces on the terminal device A are A1 and A2; and IP addresses of the interfaces on the terminal device B are B1 and B2. When the terminal device A uses MPTCP technology to communicate with the terminal device B, the terminal device A may use both a WiFi interface and a cellular network interface to communicate with the terminal device B. To be specific, a TCP subflow supporting the MPTCP technology is established on each of the WiFi interface and the cellular network interface, and therefore, each of the terminal device A and the terminal device B may use two interfaces to perform communication, thereby increasing communication bandwidth.

The following describes the technical solutions in the embodiments of this application with reference to the accompanying drawings in the embodiments of this application. In the description of this application, "/" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, in the descriptions of this application, "a plurality of" means two or more than two.

Figure 5:
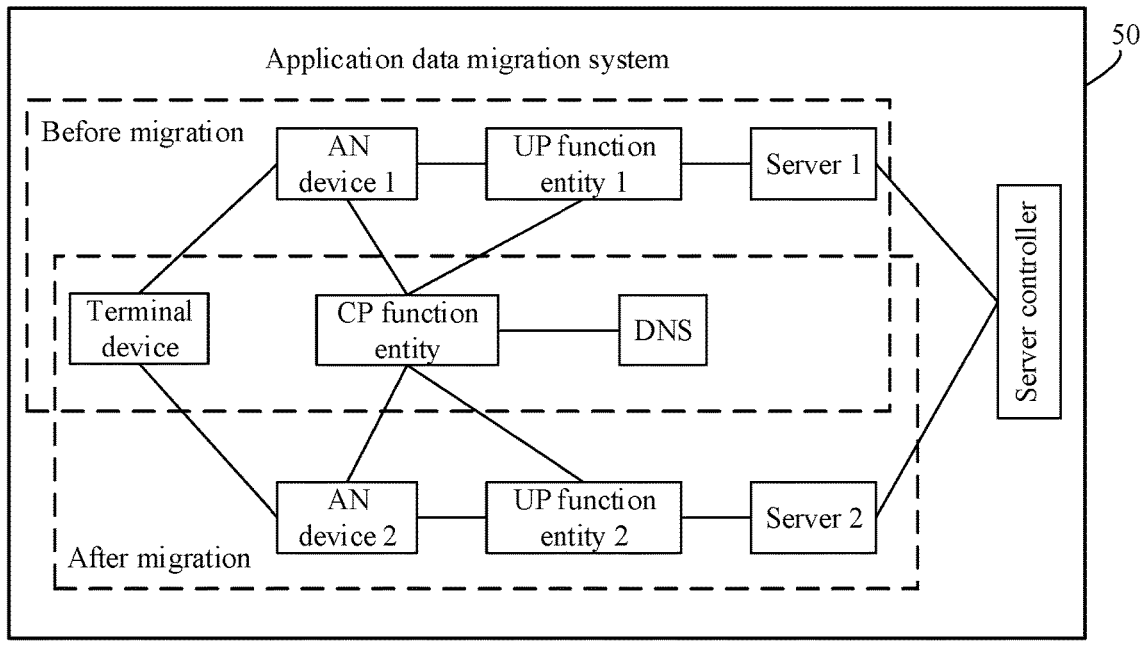
FIG. 5 is a schematic structural diagram of an application data migration system according to an embodiment of this application.

FIG. 5 is a schematic structural diagram of an application data migration system 50 according to an embodiment of this application. The application data migration system 50 includes: a terminal device, a CP function entity, a DNS, at least two AN devices, at least two UP function entities, and at least two servers. The at least two AN devices may be, for example, an AN device 1 and an AN device 2 in FIG. 5. The at least two UP function entities may be, for example, a UP function entity 1 and a UP function entity 2 in FIG. 5. The at least two servers may be, for example, a server 1 and a server 2 in FIG. 5. The terminal device communicates with one server by using one AN device and one UP function entity. For example, in FIG. 5, before application data is migrated, the terminal device communicates with the server 1 by using the AN device 1 and the UP function entity 1. After the application data is migrated, the terminal device communicates with the server 2 by using the AN device 2 and the UP function entity 2.

The terminal device in this embodiment of this application may include various handheld devices, in-vehicle devices, wearable devices, or computing devices that have a wireless communication function, or another processing device connected to a wireless modem. The terminal device may also be referred to as user equipment (UE), a mobile station (MS), or a terminal, or the terminal device may include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or the like.

The AN device (for example, the AN device 1 or the AN device 2) in this embodiment of this application is an apparatus that is deployed in a radio access network and that is configured to provide a wireless communication function for the terminal device. The AN device may include base stations in various forms, such as a macro base station, a micro base station (also referred to as a small cell), a relay station, and an access point. In systems that use different radio access technologies, devices having a base station function may have different names. For example, in a long term evolution (LTE) system, the device is referred to as an evolved NodeB (eNB or eNodeB), and in a 3rd generation (G) system, the device is referred to as a NodeB.

The CP function entity in this embodiment of this application may be responsible for attach, mobility management, and tracking area update procedures of the terminal device, session management of the terminal device, selection of an UP function entity, reselection of a user plane device, IP address allocation, QoS control, resource establishment, modification, and release, and the like.

The UP function entity (for example, the UP function entity 1 or the UP function entity 2) in this embodiment of this application may be responsible for processing functions such as forwarding and statistics of packets of the terminal device. For example, the UP function entity may implement user plane functions of a serving gateway (SGW) and a packet data network gateway (PGW). The UP function entity may alternatively be a software-defined network (SDN) switch.

The DNS in this embodiment of this application is a database in which a domain name and an IP address are in a mapping relationship. An IP address corresponding to a domain name can be obtained by querying the DNS.

The server (for example, the server 1 or the server 2) in this embodiment of this application may be responsible for providing application services for various services of the terminal device. The server may alternatively be referred to as an application server (AS), an application management platform, or a mobile edge computing (MEC) platform.

In one embodiment, the application data migration system 50 may further include a server controller. The server controller is configured to manage a plurality of servers. For example, the server controller in FIG. 5 manages the server 1 and the server 2 in FIG. 5.

Figure 6:
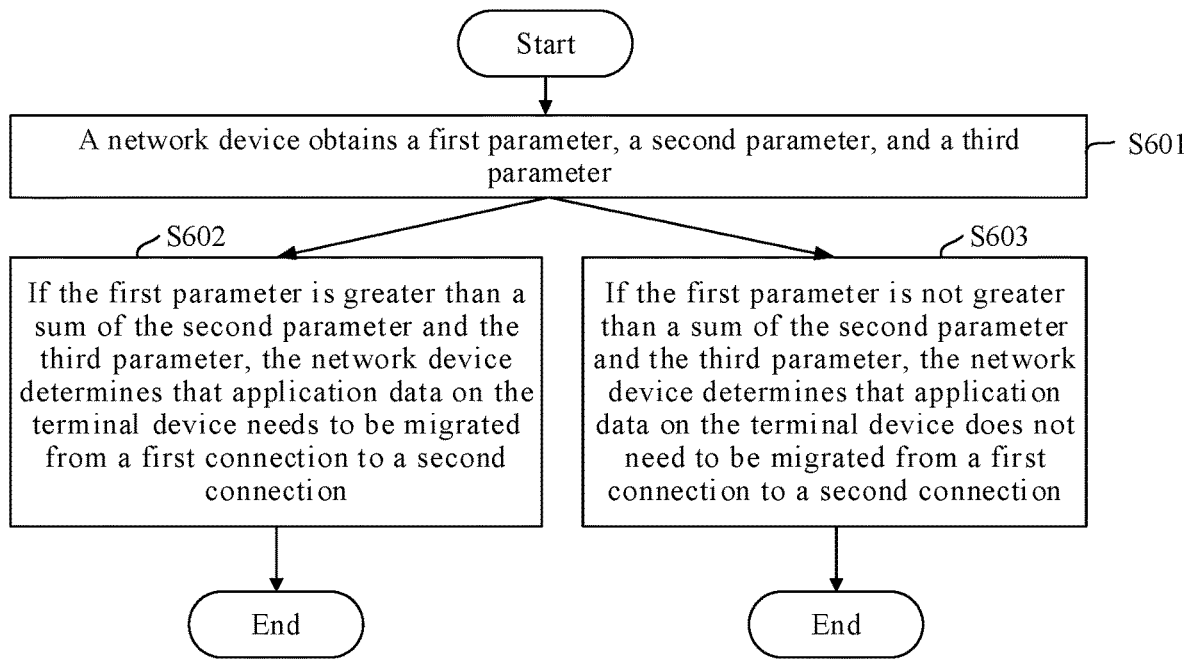
FIG. 6 is a schematic flowchart of an application data migration method according to an embodiment of this application.

FIG. 6 is a schematic flowchart of an application data migration method according to an embodiment of this application. The application data migration method includes the following steps S601 to S603.

S601. A network device obtains a first parameter, a second parameter, and a third parameter.

The first parameter includes a delay in communication between a terminal device and a first server through a first connection, the second parameter includes a delay in communication between the terminal device and a second server through a second connection, and the third parameter includes a time for synchronizing a context between the first server and the second server.

In one embodiment, the network device in this embodiment of this application may be the server controller in FIG. 5, or may be any one of the servers in FIG. 5, for example, the server 1 or the server 2. This is not specifically limited in this embodiment of this application. The first server and the second server are different servers, for example, may be the server 1 and the server 2 respectively in FIG. 5. This is not specifically limited in this embodiment of this application.

For example, in this embodiment of this application, the context synchronized between the first server and the second server is a context of the terminal device reserved on the first server before the terminal device moves. The context of the terminal device includes application layer information and transmission status information of the terminal device. For example, the transmission status information includes window information and a sequence number. In addition, the context of the terminal device further includes downlink data that is buffered by the first server and that is to be sent to the terminal device.

S602. If the first parameter is greater than a sum of the second parameter and the third parameter, the network device determines that application data on the terminal device needs to be migrated from the first connection to the second connection.

Specifically, the application data in this application is original application data. In other words, the application data in this application is application data used for communication between the terminal device and the first server before the terminal device moves. A description is provided herein, and details are not described below again.

S603. If the first parameter is not greater than a sum of the second parameter and the third parameter, the network device determines that application data on the terminal device does not need to be migrated from the first connection to the second connection.

In other words, a migration determining mechanism is introduced in the application data migration method provided in this embodiment of this application. During migration determining, the determining is performed based on the delay in communication between the terminal device and the first server through the first connection, the delay in communication between the terminal device and the second server through the second connection, and the time for synchronizing the context between the first server and the second server; and when the delay in communication between the terminal device and the first server through the first connection is greater than a sum of the delay in communication between the terminal device and the second server through the second connection and the time for synchronizing the context between the first server and the second server, it is determined that the application data on the terminal device needs to be migrated from the first connection to the second connection; otherwise, it is determined that the application data does not need to be migrated from the first connection to the second connection. In this way, the following problem in the prior art is avoided: when the terminal device moves, the original application data on the terminal device may be all migrated or not migrated, which may degrade communication quality, and cause a waste of network resources. Therefore, according to the application data migration method provided in this embodiment of this application, after the terminal device moves, an optimal communication path is provided for the original application data, thereby saving network resources and improving communication efficiency.

The following describes the application data migration method shown in FIG. 6 with reference to FIG. 7A and FIG. 7B to FIG. 12A, FIG. 12B, and FIG. 12C.

Figure 7A:
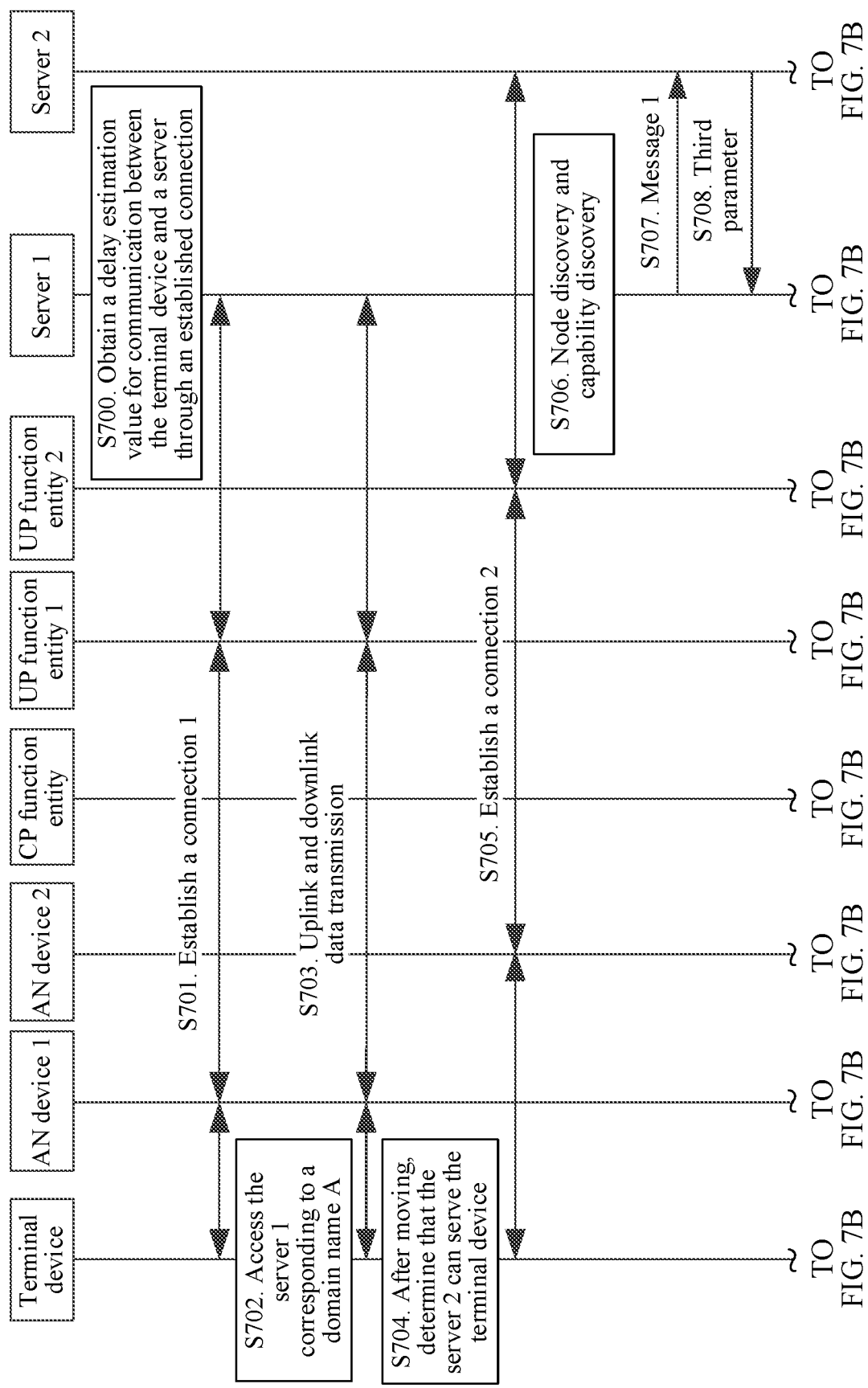
FIG. 7A and FIG. 7B are a schematic interaction diagram 1 of an application data migration method according to an embodiment of this application.
Figure 7B:
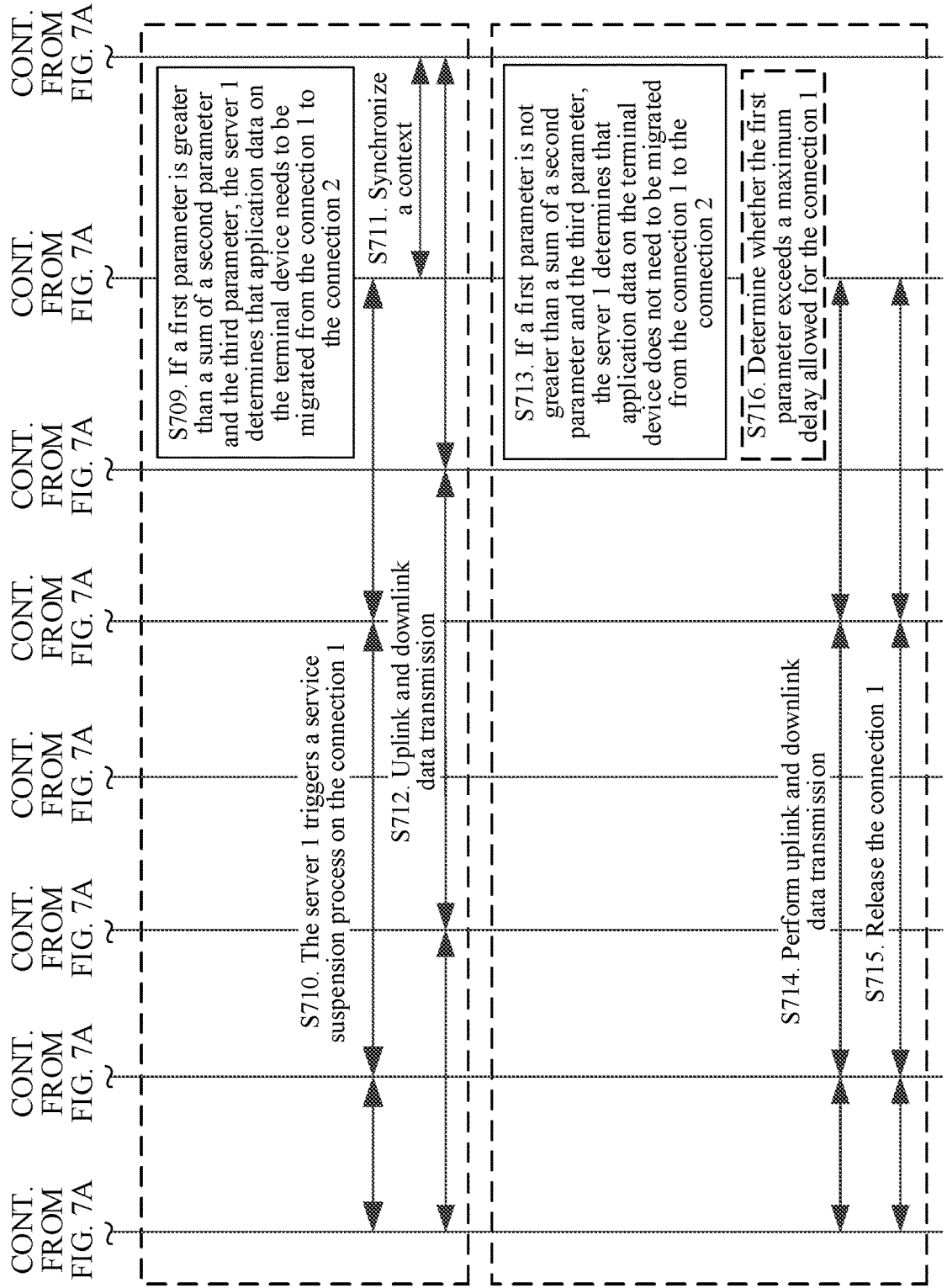

FIG. 7A and FIG. 7B are a schematic flowchart of an application data migration method according to an embodiment of this application. The application data migration method is described by using an example in which a network device is the server 1 in FIG. 5, relates to interaction of the terminal device, the AN device 1, the AN device 2, the CP function entity, the UP function entity 1, the UP function entity 2, the server 1, and the server 2 in FIG. 5, and includes the following steps.

S700. The server 1 obtains a delay estimation value for communication between the terminal device and a server through an established connection, where the server herein may include the server 2. In one embodiment, the server may further include the server 1.

The delay estimation value may be an average value of a plurality of empirical values. For example, the plurality of empirical values include at least one of the following: a delay in communication between the terminal device and the server 1 through a connection 1 after the terminal device establishes the connection 1 to the server 1, a delay in communication between the terminal device and the server 2 through a connection 2 after the terminal device establishes the connection 2 to the server 2, . . . , and a delay in communication between the terminal device and a server n through a connection n after the terminal device establishes the connection n to the server n.

In one embodiment, after obtaining the plurality of empirical values and calculating the average value of the plurality of empirical values, the terminal device or a server controller sends the average value to the server 1. The server 1 receives the average value, and uses the average value as the delay estimation value for communication between the terminal device and the server. Alternatively, in one embodiment, the terminal device or a server controller obtains the plurality of empirical values, and sends the plurality of empirical values to the server 1. The server 1 receives the plurality of empirical values, calculates the average value of the plurality of empirical values, and uses the average value as the delay estimation value for communication between the terminal device and the server. This is not specifically limited in this embodiment of this application.

S701. The terminal device establishes the connection 1 to the server 1 by using the AN device 1 and the UP function entity 1.

Certainly, before the terminal device establishes the connection 1 to the server 1 by using the AN device 1 and the UP function entity 1, the terminal device needs to further establish a PDU session with the UP function entity 1 by using the AN device 1 and the CP function entity. For a connection establishment process of the PDU session, refer to the PDU session establishment process in the foregoing part of the descriptions of the embodiments, and details are not described herein again.

In one embodiment, the connection between the terminal device and the server (for example, the connection 1 between the terminal device and the server 1, or the connection 2 between the terminal device and the server 2) may be a TCP connection, or may be an MPTCP connection. A description is provided herein, and details are not described below again. For related descriptions of the TCP connection and the MPTCP connection, refer to the foregoing part of the descriptions of the embodiments, and details are not described herein again.

S702. The terminal device accesses the server 1 corresponding to a domain name A, where it is assumed that an IP address of the server 1 is denoted as IP 1.

S703. The terminal device communicates, for example, performs uplink and downlink data transmission with the server 1 by using the AN device 1 and the UP function entity 1.

S704. After the terminal device moves, the terminal device determines that the server 2 can serve the terminal device, where it is assumed that an IP address of the server 2 is denoted as IP 2.

In one embodiment, a DNS server may be queried based on location information of the terminal device, so as to learn that the server 2 can serve the terminal device. This is not specifically limited in this embodiment of this application.

S705. The terminal device establishes the connection 2 to the server 2 by using the AN device 2 and the UP function entity 2.

Certainly, before the terminal device establishes the connection 2 to the server 2 by using the AN device 2 and the UP function entity 2, the terminal device needs to further establish a PDU session with the UP function entity 2 by using the AN device 2 and the CP function entity. For a connection establishment process of the PDU session, refer to the PDU session establishment process in the foregoing part of the descriptions of the embodiments, and details are not described herein again.

In one embodiment, the terminal device may determine, after the terminal device moves and then determines that a first parameter exceeds a preset value, that the server 2 can serve the terminal device; and then, the terminal device may establish the connection 2 to the server 2 by using the AN device 2 and the UP function entity 2. This is not specifically limited in this embodiment of this application. The first parameter includes the delay in communication between the terminal device and the server 1 through the connection 1. Because the connection 1 between the terminal device and the server 1 has been established, the terminal device may detect the first parameter. For a specific detection manner, refer to an existing implementation, and details are not described herein. In this way, because application data usually does not need to be migrated when the first parameter does not exceed the preset value, after determining that the first parameter exceeds the preset value, the terminal device determines that the server 2 can serve the terminal device, and further establishes a new connection, thereby reducing unnecessary connection establishment processes, and saving system resources.

Alternatively, in one embodiment, the server 1 may determine, after the terminal device moves and then the server 1 determines that the first parameter exceeds a preset value, that the server 2 can serve the terminal device; and then, the server 1 may send IP 2 to the terminal device, and the terminal device may establish the connection 2 to the server 2 by using the AN device 2 and the UP function entity 2, to implement communication between the terminal device and the server 2. This is not specifically limited in this embodiment of this application. The first parameter includes the delay in communication between the terminal device and the server 1 through the connection 1. Because the connection 1 between the terminal device and the server 1 has been established, the server 1 may detect the first parameter. For a specific detection manner, refer to an existing implementation, and details are not described herein. Alternatively, in one embodiment, if the server in step S700 includes the server 1, the server 1 may not need to detect the first parameter, and instead, the server 1 may use the delay estimation value for communication between the terminal device and the server through the established connection as the first parameter. This is not specifically limited in this embodiment of this application.

In this way, because application data usually does not need to be migrated when the first parameter does not exceed the preset value, after determining that the first parameter exceeds the preset value, the server 1 determines that the server 2 can serve the terminal device, and further sends IP 2 to the terminal device, and the terminal device establishes a new connection, thereby reducing unnecessary connection establishment processes, and saving system resources.

In one embodiment, the terminal device or the server 1 may query the DNS server based on location information of the terminal device, so as to determine that the server 2 can serve the terminal device. This is not specifically limited in this embodiment of this application.

S706. The server 1 performs node discovery and capability discovery.

The node discovery in this embodiment of this application refers to determining an address of a peer end.

The capability discovery in this embodiment of this application refers to determining a service that can be provided by the peer end.

After the node discovery and the capability discovery succeed, step S707 is performed.

Certainly, if handover is performed by using the MIH technology in this application, step S707 is performed after it is further determined that there is an MIH registration requirement. This is not specifically limited in this embodiment of this application.

For related descriptions of MIH registration, refer to the foregoing part of the descriptions of the embodiments, and details are not described herein again.

S707. The server 1 sends a message 1 to the server 2, where the message 1 is used to request a third parameter, and the third parameter includes a time for synchronizing a context between the server 1 and the server 2.

S708. The server 2 sends the third parameter to the server 1, so that the server 1 receives the third parameter from the server 2.

In one embodiment, the server 2 may obtain the third parameter in the following manner:

The message 1 may carry time stamp information and a size of a to-be-synchronized context. In this way, the server 2 can determine a network transmission time of the context based on the time stamp information; determine, based on the size of the context, a time for processing the to-be-synchronized context by the server 2; and then add the network transmission time and the time for processing the context, to obtain the time for synchronizing the context between the server 1 and the server 2, namely, the third parameter.

Certainly, the server 2 may also obtain the third parameter in another manner. This is not specifically limited in this embodiment of this application.

For example, if the third parameter is obtained through the MIH registration, the message 1 in step S707 may be an MIH registration request message, and the third parameter in step S708 may be carried in an MIH registration response message. This is not specifically limited in this embodiment of this application.

In one embodiment, the server 1 may also obtain the third parameter in another manner. For example, the server 1 sends a synchronization time request to the server 2, and the server 2 sends a synchronization time response to the server 1, so that the server 1 determines the third parameter based on a time difference between the synchronization time request and the synchronization time response. This is not specifically limited in this embodiment of this application.

It should be noted that step S700 and step S701 to step S708 may not be necessarily performed in order. Step S700 may be first performed, and then any one of step S701 to step S708 may be performed; or any one of step S701 to step S708 may be first performed, and then step S700 may be performed. This is not specifically limited in this embodiment of this application.

S709. If the first parameter is greater than a sum of a second parameter and the third parameter, the server 1 determines that application data on the terminal device needs to be migrated from the connection 1 to the connection 2.

The server in step S700 includes the server 2. Therefore, in this embodiment of this application, the delay estimation value that is of communication between the terminal device and the server through the established connection and that is obtained by the server 1 in step S700 may be used as the second parameter.

S710. The server 1 triggers a service suspension process on the connection 1.

S711. Synchronize the context between the server 1 and the server 2.

S712. After context synchronization between the server 1 and the server 2 is completed, the terminal device communicates, for example, performs uplink and downlink data transmission with the server 2 by using the AN device 2 and the UP function entity 2.

S713. If the first parameter is not greater than a sum of a second parameter and the third parameter, the server 1 determines that application data on the terminal device does not need to be migrated from the connection 1 to the connection 2.

Further, the server 1 may perform step S714 or step S715.

S714. The server 1 transmits the application data through the connection 1.

S715. The server 1 releases the connection 1.

In one embodiment, as shown in FIG. 7A and FIG. 7B, after step S713 and before step S714 or step S715, the method may further include the following step:

S716. The server 1 determines whether the first parameter exceeds a maximum delay allowed for the connection 1.

If the first parameter does not exceed the maximum delay allowed for the connection 1, step S714 is performed; or if the first parameter exceeds the maximum delay allowed for the connection 1, step S715 is performed.

The server 1 transmits the application data through the connection 1 only when it is determined that the first parameter does not exceed the maximum delay allowed for the connection 1, thereby avoiding a problem that the application data fails to be transmitted because the first parameter exceeds the maximum delay allowed for the connection 1, and improving transmission reliability of the application data.

Certainly, if the first parameter exceeds the maximum delay allowed for the connection 1, the server 1 further instructs the terminal device or the CP function entity to release the PDU session between the terminal device and the UP function entity 1. This is not specifically limited in this embodiment of this application.

In one embodiment, after the connection 1 is released, the terminal device may further establish a new connection to transmit the application data. This is not specifically limited in this embodiment of this application.

In the application data migration method provided in this embodiment of this application, migration determining is performed by the server 1. During the migration determining, the determining is performed based on the delay in communication between the terminal device and the server 1 through the connection 1, the delay in communication between the terminal device and the server 2 through the connection 2, and the time for synchronizing the context between the server 1 and the server 2; and when the delay in communication between the terminal device and the server 1 through the connection 1 is greater than a sum of the delay in communication between the terminal device and the server 2 through the connection 2 and the time for synchronizing the context between the server 1 and the server 2, it is determined that the application data on the terminal device needs to be migrated from the connection 1 to the connection 2; otherwise, it is determined that the application data does not need to be migrated from the connection 1 to the connection 2. Therefore, after the terminal device moves, an optimal communication path is provided for original application data, thereby saving network resources and improving communication efficiency.

Figure 8A:
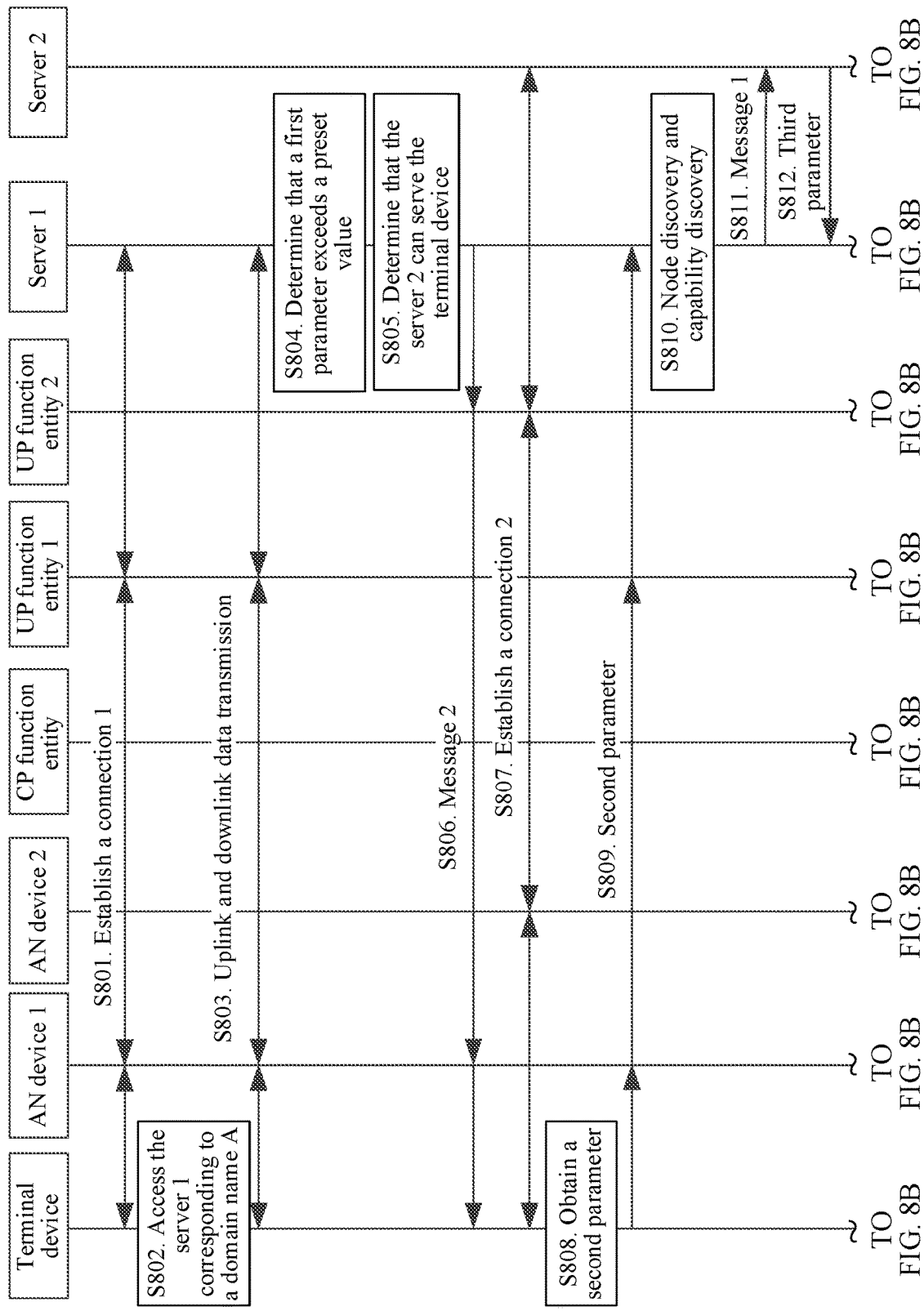
FIG. 8A and FIG. 8B are a schematic interaction diagram 2 of an application data migration method according to an embodiment of this application.
Figure 8B:
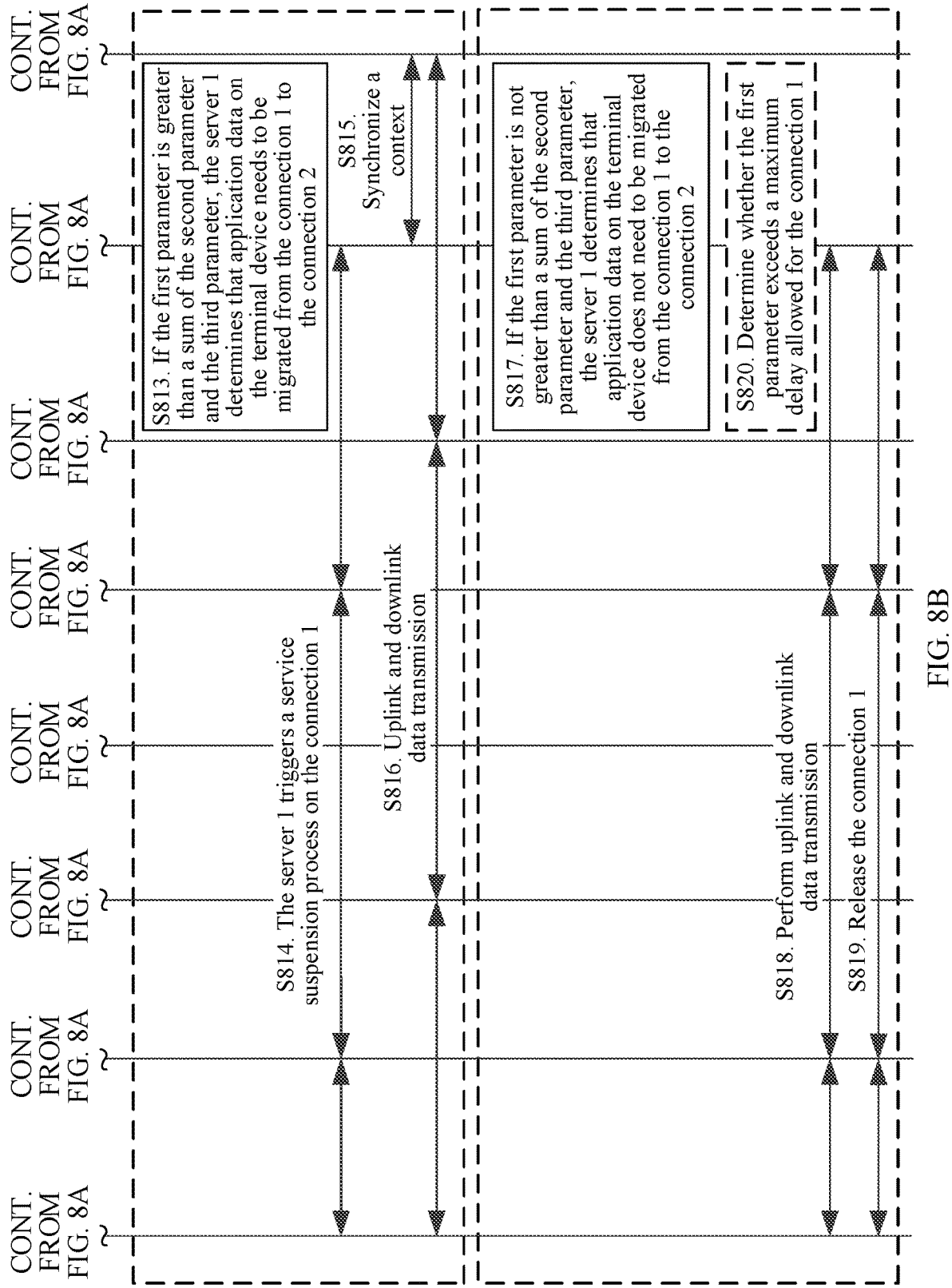

In one embodiment, FIG. 8A and FIG. 8B are a schematic flowchart of an application data migration method according to an embodiment of this application. The application data migration method is described by using an example in which a network device is the server 1 in FIG. 5, relates to interaction of the terminal device, the AN device 1, the AN device 2, the CP function entity, the UP function entity 1, the UP function entity 2, the server 1, and the server 2 in FIG. 5, and includes the following steps.

Step S801 to step S803 are the same as step S701 to step S703. For details, refer to the embodiment shown in FIG. 7A and FIG. 7B, and the details are not described herein again.

S804. The server 1 determines that a first parameter exceeds a preset value.

The first parameter includes a delay in communication between the terminal device and the server 1 through the connection 1. Because the connection 1 between the terminal device and the server 1 has been established, the server 1 may detect the first parameter. For a specific detection manner, refer to an existing implementation. Details are not described herein.

S805. The server 1 determines that the server 2 can serve the terminal device, where it is assumed that an IP address of the server 2 is denoted as IP 2.

S806. The server 1 sends a message 2 to the terminal device by using the UP function entity 1 and the AN device 1. The message 2 carries IP 2, and is used to request a second parameter. The second parameter includes a delay in communication between the terminal device and the server 2 through a connection 2.

S807. The terminal device establishes, based on IP 2, the connection 2 to the server 2 by using the AN device 2 and the UP function entity 2.

Certainly, before the terminal device establishes the connection 2 to the server 2 by using the AN device 2 and the UP function entity 2, the terminal device needs to further establish a PDU session with the UP function entity 2 by using the AN device 2 and the CP function entity. For a connection establishment process of the PDU session, refer to the PDU session establishment process in the foregoing part of the descriptions of the embodiments, and details are not described herein again.

S808. The terminal device obtains the second parameter based on the connection 2.

Because the connection 2 between the terminal device and the server 2 has been established, the terminal device may detect the second parameter. For a specific detection manner, refer to an existing implementation, and details are not described herein.

Alternatively, in one embodiment, the terminal device may determine, after the terminal device moves, that the server 2 can serve the terminal device; and then, after receiving the message that is used to request the second parameter and that is sent by the server 1, the terminal device establishes the connection 2 to the server 2 by using the AN device 2 and the UP function entity 2, and further obtains the second parameter based on the connection 2. This is not specifically limited in this embodiment of this application.

Alternatively, in one embodiment, the terminal device may determine, after the terminal device moves, that the server 2 can serve the terminal device, and then directly establishes, based on IP 2, the connection 2 to the server 2 by using the AN device 2 and the UP function entity 2. This is not specifically limited in this embodiment of this application.

In one embodiment, the terminal device or the server 1 may query a DNS server based on location information of the terminal device, so as to determine that the server 2 can serve the terminal device. This is not specifically limited in this embodiment of this application.

S809. The terminal device sends the second parameter to the server 1, so that the server 1 receives the second parameter from the terminal device.

In an example, the message 2 in step S806 may be a delay request message, and the second parameter in step S809 may be carried in a delay response message. This is not specifically limited in this embodiment of this application.

Step S810 to step S820 are the same as step S706 to step S716. For details, refer to the embodiment shown in FIG. 7A and FIG. 7B, and the details are not described herein again.

A difference between this embodiment and the embodiment shown in FIG. 7A and FIG. 7B lies in that, the second parameter is received by the server 1 from the terminal device in the embodiment shown in FIG. 8A and FIG. 8B, while a pre-configured second parameter is obtained by the server 1 in the embodiment shown in FIG. 7A and FIG. 7B. For beneficial effects, refer to the embodiment shown in FIG. 7A and FIG. 7B, and details are not described herein again.

Figure 9A:
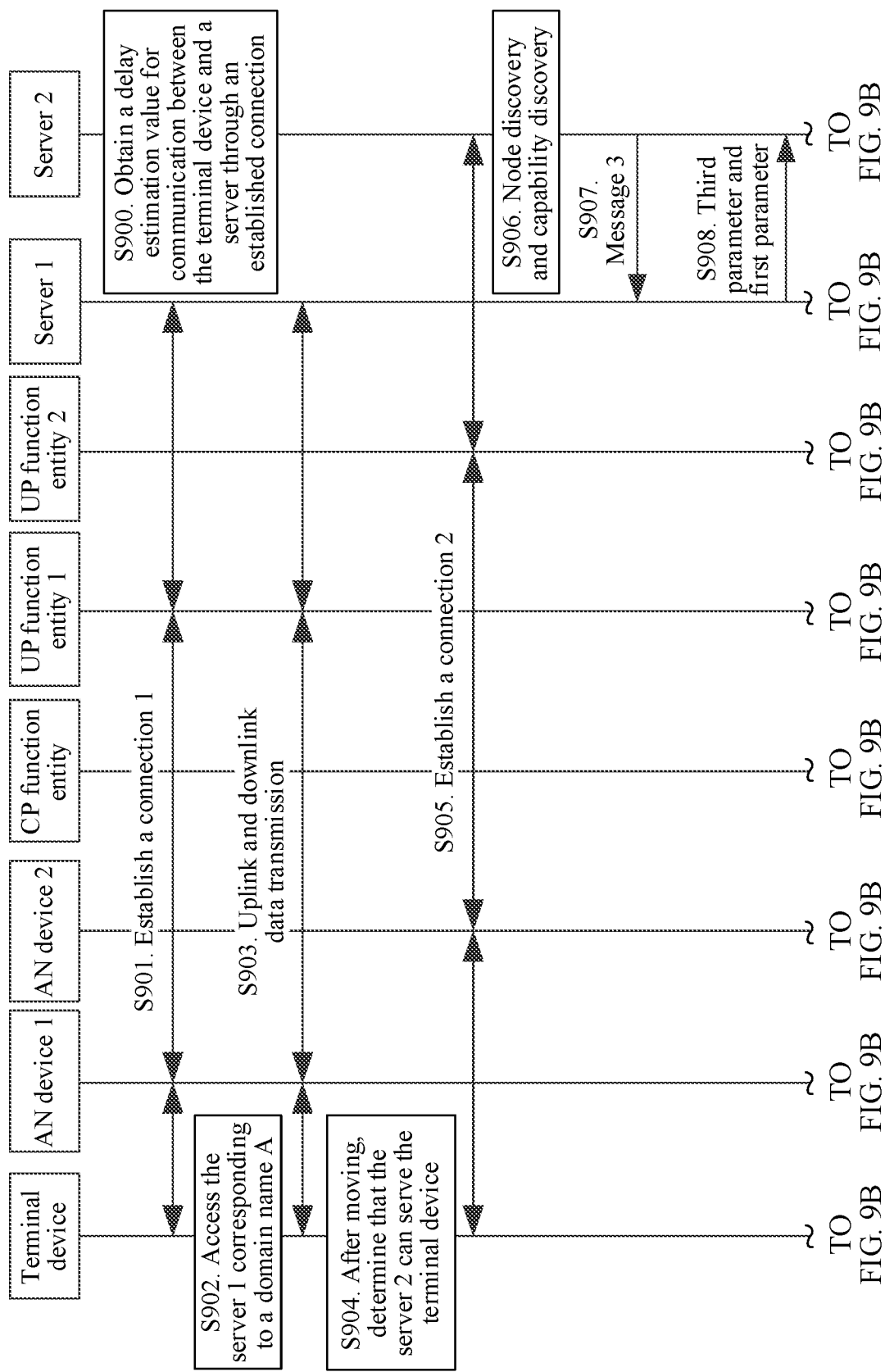
FIG. 9A, FIG. 9B and FIG. 9C are a schematic interaction diagram 3 of an application data migration method according to an embodiment of this application.
Figure 9B:
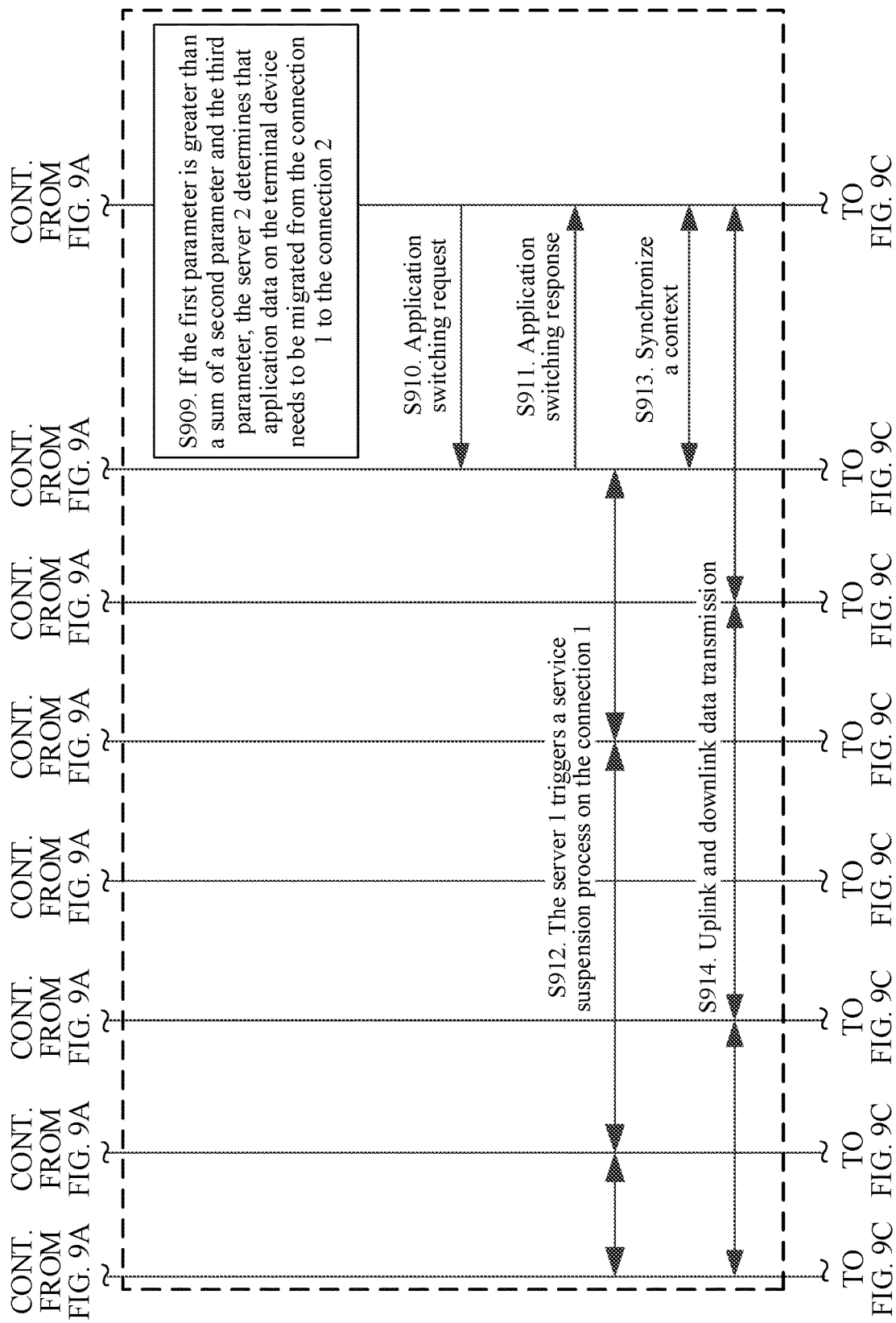
Figure 9C:
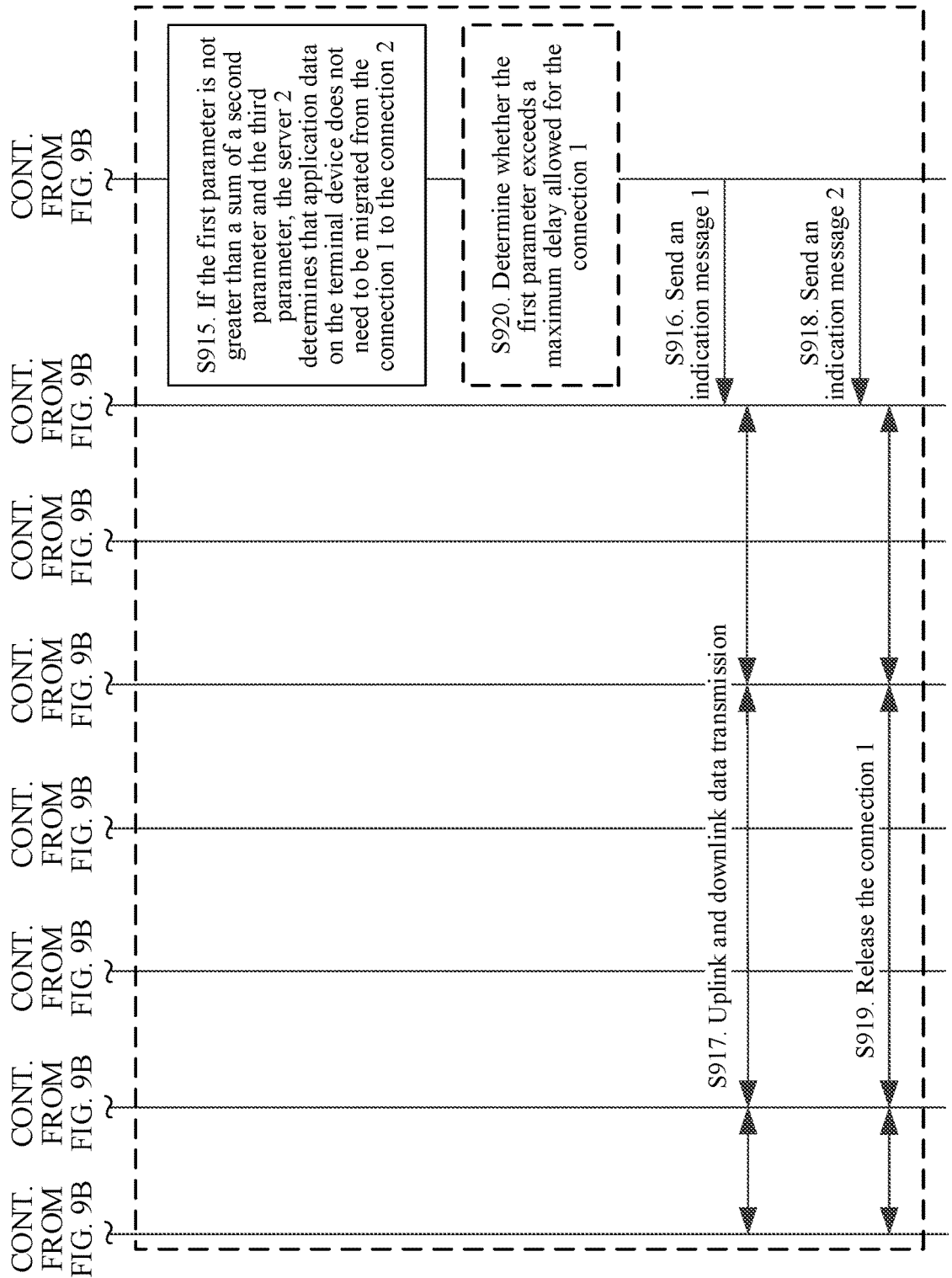

In one embodiment, FIG. 9A, FIG. 9B and FIG. 9C are a schematic flowchart of an application data migration method according to an embodiment of this application. The application data migration method is described by using an example in which a network device is the server 2 in FIG. 5, and relates to interaction of the terminal device, the AN device 1, the AN device 2, the CP function entity, the UP function entity 1, the UP function entity 2, the server 1, and the server 2 in FIG. 5, and includes the following steps.

S900. The server 2 obtains a delay estimation value for communication between the terminal device and a server through an established connection. The server herein may include the server 2. In one embodiment, the server may further include the server 1.

The delay estimation value may be an average value of a plurality of empirical values. For example, the plurality of empirical values include at least one of the following: a delay in communication between the terminal device and the server 1 through a connection 1 after the terminal device establishes the connection 1 to the server 1, a delay in communication between the terminal device and the server 2 through a connection 2 after the terminal device establishes the connection 2 to the server 2, . . . , and a delay in communication between the terminal device and a server n through a connection n after the terminal device establishes the connection n to the server n.

In one embodiment, after obtaining the plurality of empirical values and calculating the average value of the plurality of empirical values, the terminal device or a server controller sends the average value to the server 2. The server 2 receives the average value, and uses the average value as the delay estimation value for communication between the terminal device and the server. Alternatively, in one embodiment, the terminal device or a server controller obtains the plurality of empirical values, and sends the plurality of empirical values to the server 2. The server 2 receives the plurality of empirical values, calculates the average value of the plurality of empirical values, and uses the average value as the delay estimation value for communication between the terminal device and the server. This is not specifically limited in this embodiment of this application.

Step S901 to step S905 are the same as step S701 to step S705. For details, refer to the embodiment shown in FIG. 7A and FIG. 7B, and the details are not described herein again.

S906. The server 2 performs node discovery and capability discovery.

The node discovery in this embodiment of this application refers to determining an address of a peer end.

The capability discovery in this embodiment of this application refers to determining a service that can be provided by the peer end.

After the node discovery and the capability discovery succeed, step S907 is performed.

Certainly, if handover is performed by using the MIH technology in this application, step S707 is performed after it is further determined that there is an MIH registration requirement. This is not specifically limited in this embodiment of this application.

For related descriptions of MIH registration, refer to the foregoing part of the descriptions of the embodiments, and details are not described herein again.

S907. The server 2 sends a message 3 to the server 1, where the message 3 is used to request a third parameter and a first parameter, the third parameter includes a time for synchronizing a context between the server 1 and the server 2, and the first parameter includes the delay in communication between the terminal device and the server 1 through the connection 1.

S908. The server 1 sends the third parameter and the first parameter to the server 2, so that the server 2 receives the third parameter and the first parameter from the server 1.

In one embodiment, the server 1 may obtain the third parameter in the following manner:

The message 3 may carry time stamp information and a size of a to-be-synchronized context. In this way, the server 1 can determine a network transmission time of the context based on the time stamp information; determine, based on the size of the context, a time for processing the to-be-synchronized context by the server 1; and then add the network transmission time and the time for processing the context, to obtain the time for synchronizing the context between the server 1 and the server 2, namely, the third parameter.

Certainly, the server 1 may also obtain the third parameter in another manner. This is not specifically limited in this embodiment of this application.

For example, if the third parameter and the first parameter are obtained through the MIH registration, the message 3 in step S907 may be an MIH registration request message, and the third parameter and the first parameter in step S908 may be carried in the MIH registration request message. This is not specifically limited in this embodiment of this application.

Because the connection 1 between the terminal device and the server 1 has been established, the server 1 may detect the first parameter, and then send the first parameter to the server 2. For a specific detection manner, refer to an existing implementation, and details are not described herein.

In one embodiment, the server 2 may also obtain the third parameter in another manner. For example, the server 2 sends a synchronization time request to the server 1, and the server 1 sends a synchronization time response to the server 2, so that the server 2 determines the third parameter based on a time difference between the synchronization time request and the synchronization time response. This is not specifically limited in this embodiment of this application.

In one embodiment, if the server in step S900 includes the server 1, the server 1 may not need to send the first parameter to the server 2, and instead, the server 2 may use the delay estimation value for communication between the terminal device and the server through the established connection as the first parameter. This is not specifically limited in this embodiment of this application.

It should be noted that step S900 and step S901 to step S908 may not be necessarily performed in order. Step S900 may be first performed, and then any one of step S901 to step S908 may be performed; or any one of step S901 to step S908 may be first performed, and then step S900 may be performed. This is not specifically limited in this embodiment of this application.

S909. If the first parameter is greater than a sum of a second parameter and the third parameter, the server 2 determines that application data on the terminal device needs to be migrated from the connection 1 to the connection 2.

The server in step S900 includes the server 2. Therefore, in this embodiment of this application, the delay estimation value that is of communication between the terminal device and the server through the established connection and that is obtained by the server 2 in step S900 may be used as the second parameter.

S910. The server 2 sends an application switching request to the server 1.

S911. The server 1 sends an application switching response to the server 2.

S912. The server 1 triggers a service suspension process on the connection 1.

S913. Synchronize the context between the server 1 and the server 2.

S914. After context synchronization between the server 1 and the server 2 is completed, the terminal device communicates, for example, performs uplink and downlink data transmission with the server 2 by using the AN device 2 and the UP function entity 2.

S915. If the first parameter is not greater than a sum of a second parameter and the third parameter, the server 2 determines that application data on the terminal device does not need to be migrated from the connection 1 to the connection 2.

Further, the server 1 may perform step S916 and step S917 or step S918 and step S919.

S916. The server 2 sends an indication message 1 to the server 1, where the indication message 1 is used to instruct the server 1 to transmit the application data through the connection 1.

S917. The server 1 transmits the application data through the connection 1 according to the indication message 1.

S918. The server 2 sends an indication message 2 to the server 1, where the indication message 2 is used to instruct the server 1 to release the connection 1 between the terminal device and the UP function entity 1.

S919. The server 1 releases the connection 1 according to the indication message 2.

In one embodiment, as shown in FIG. 9A, FIG. 9B and FIG. 9C, after step S915 and before step S916 or step S918, the method may further include the following step:

S920. The server 2 determines whether the first parameter exceeds a maximum delay allowed for the connection 1.

If the first parameter does not exceed the maximum delay allowed for the connection 1, step S916 is performed; or if the first parameter exceeds the maximum delay allowed for the connection 1, step S918 is performed.

The server 2 sends the indication message 1 to the server 1 only when it is determined that the first parameter does not exceed the maximum delay allowed for the connection 1, and the indication message 1 is used to instruct the server 1 to transmit the application data through the connection 1, thereby avoiding a problem that the application data fails to be transmitted because the first parameter exceeds the maximum delay allowed for the connection 1, and improving transmission reliability of the application data.

Certainly, if the first parameter exceeds the maximum delay allowed for the connection 1, the server 2 further instructs the server 1 to instruct the terminal device or the CP function entity to release a PDU session between the terminal device and the UP function entity 1. This is not specifically limited in this embodiment of this application.

In one embodiment, after the connection 1 is released, the terminal device may further establish a new connection to transmit the application data. This is not specifically limited in this embodiment of this application.

Alternatively, in one embodiment, after step S915, the method includes: the server 2 notifies the server 1 not to migrate the application data on the terminal device from the connection 1 to the connection 2, and the server 1 determines whether the first parameter exceeds the maximum delay allowed for the connection 1; and if the first parameter exceeds the maximum delay allowed for the connection 1, the server 1 releases the connection 1; or if the first parameter does not exceed the maximum delay allowed for the connection 1, the server 1 transmits the application data through the connection 1.

A difference between this embodiment and the embodiment shown in FIG. 7A and FIG. 7B lies in that, migration determining is performed by the server 2 in the embodiment shown in FIG. 9A, FIG. 9B and FIG. 9C, while the migration determining is performed by the server 1 in the embodiment shown in FIG. 7A and FIG. 7B.

In the application data migration method provided in this embodiment of this application, the migration determining is performed by the server 2. During the migration determining, the determining is performed based on the delay in communication between the terminal device and the server 1 through the connection 1, the delay in communication between the terminal device and the server 2 through the connection 2, and the time for synchronizing the context between the server 1 and the server 2; and when the delay in communication between the terminal device and the server 1 through the connection 1 is greater than a sum of the delay in communication between the terminal device and the server 2 through the connection 2 and the time for synchronizing the context between the server 1 and the server 2, it is determined that the application data on the terminal device needs to be migrated from the connection 1 to the connection 2; otherwise, it is determined that the application data does not need to be migrated from the connection 1 to the connection 2. Therefore, after the terminal device moves, an optimal communication path is provided for original application data, thereby saving network resources and improving communication efficiency.

Figure 10A:
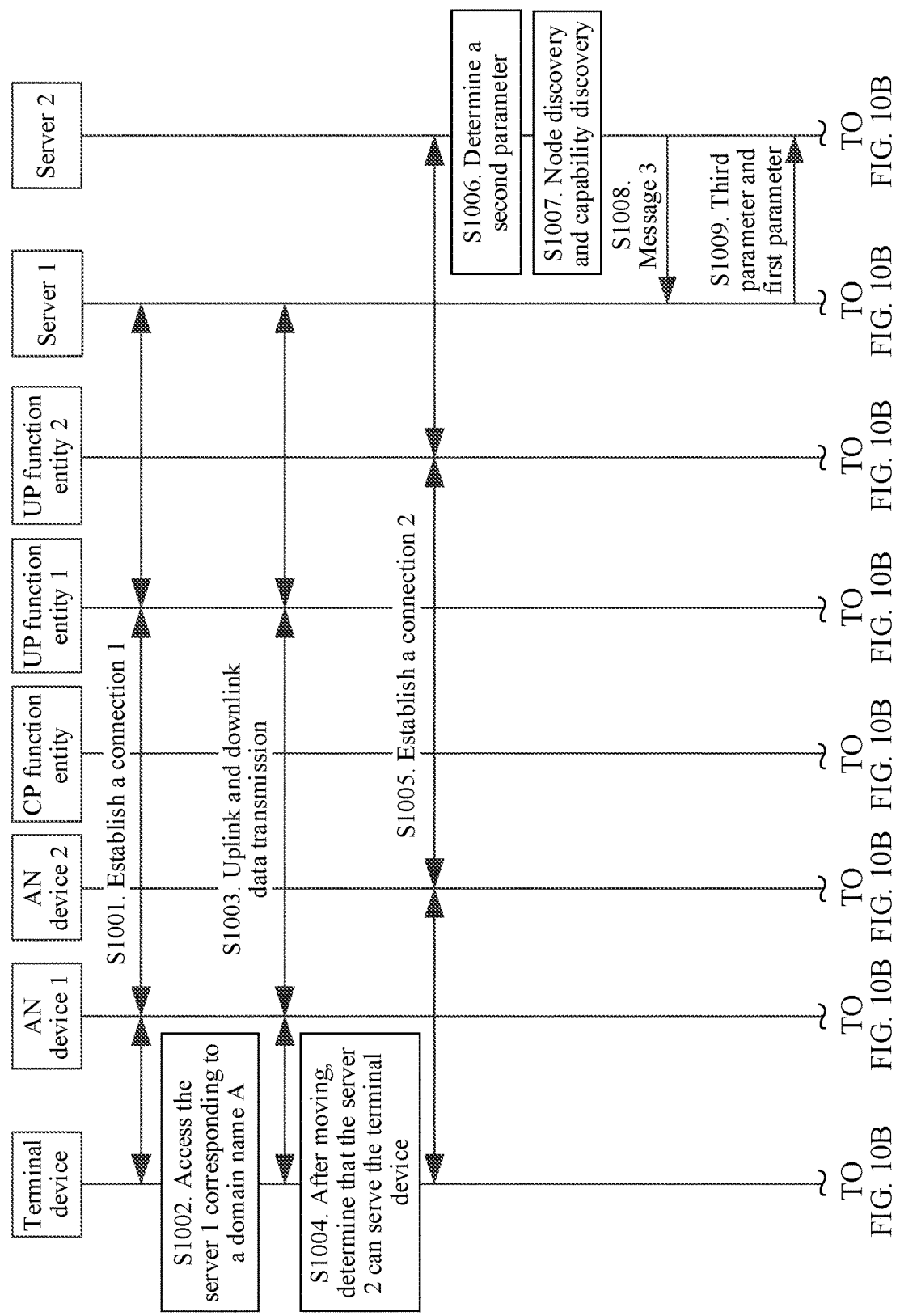
FIG. 10A, FIG. 10B, and FIG. 10C are a schematic interaction diagram 4 of an application data migration method according to an embodiment of this application.
Figure 10B:
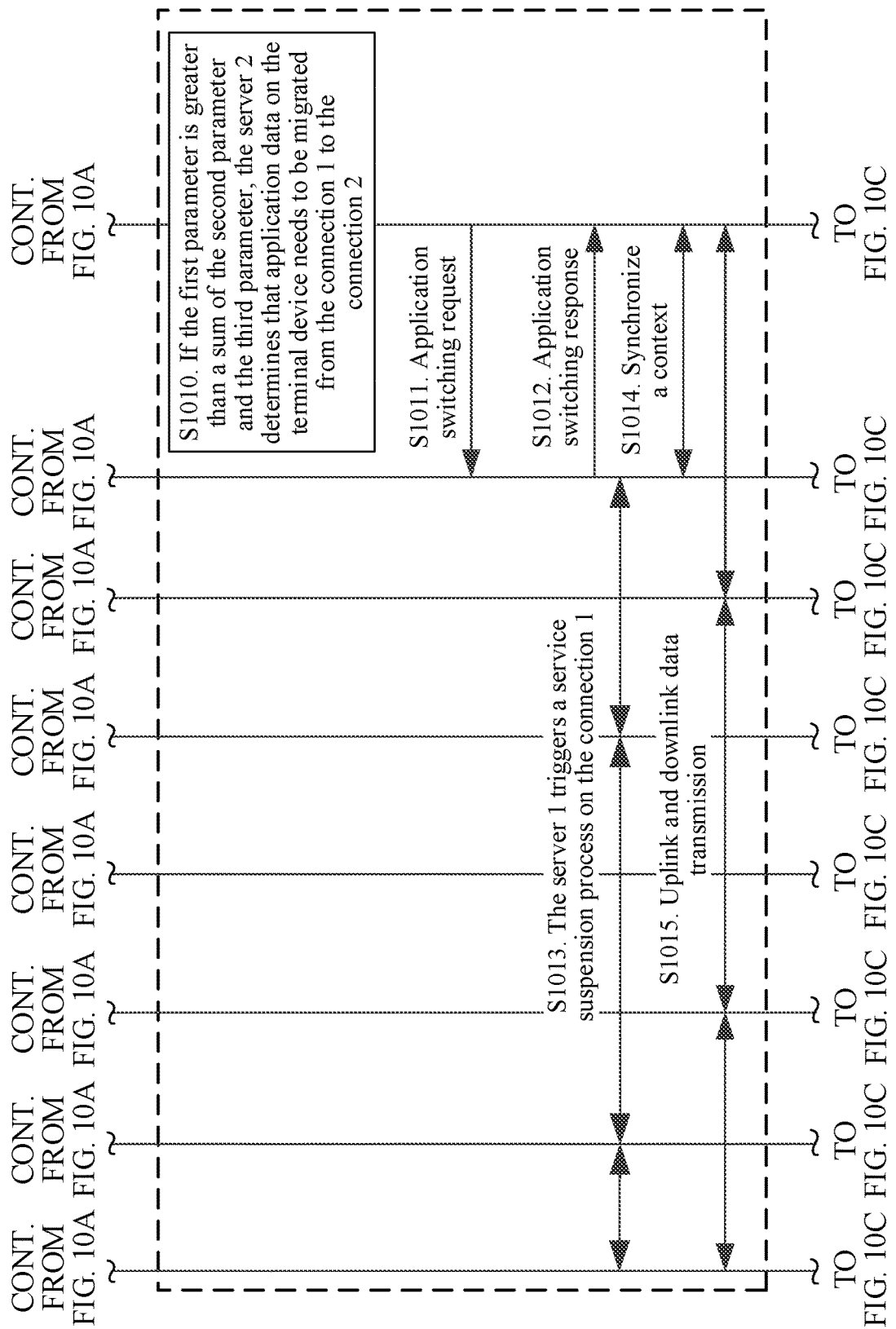
Figure 10C:
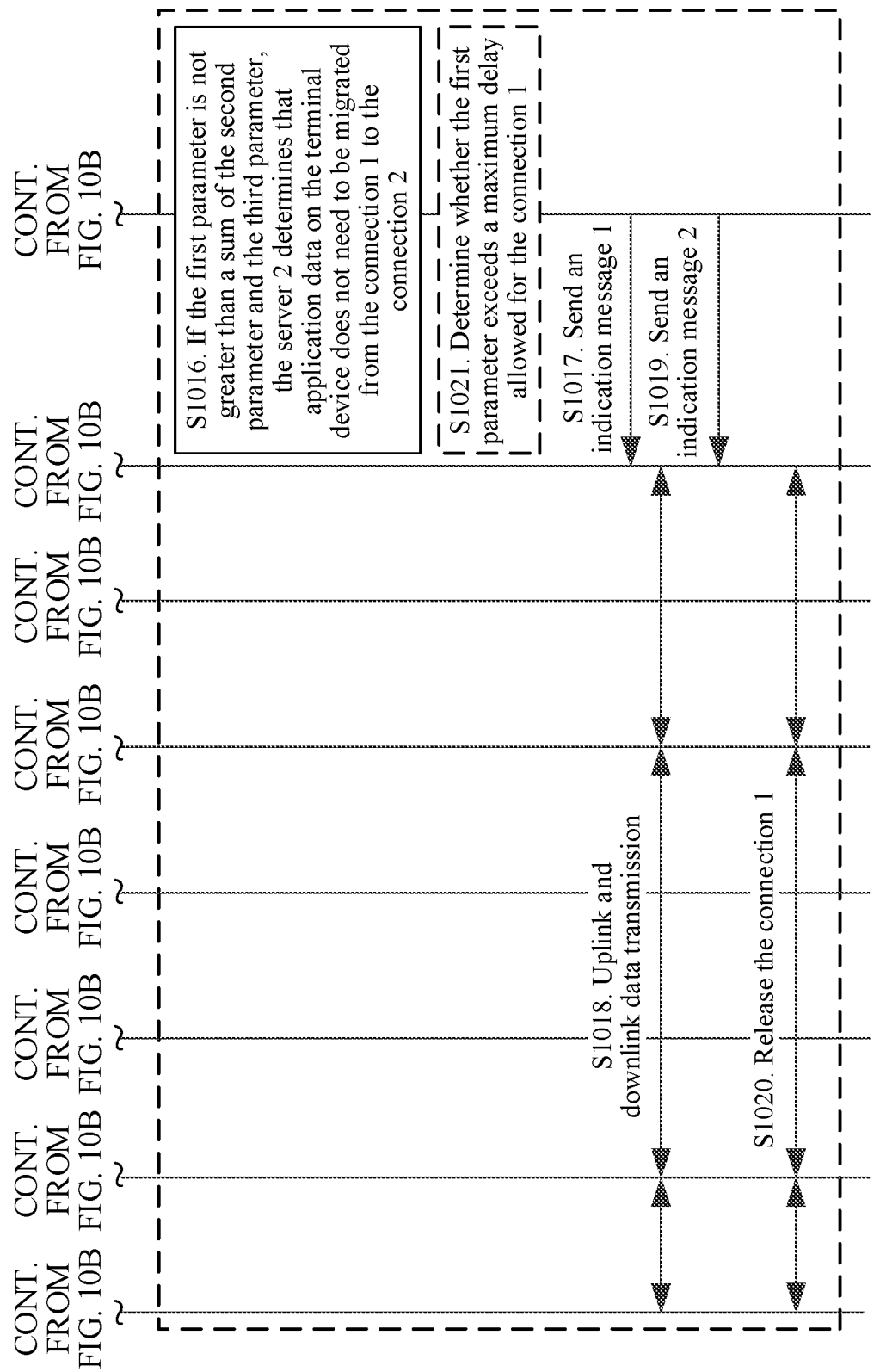

In one embodiment, FIG. 10A, FIG. 10B, and FIG. 10C are a schematic flowchart of an application data migration method according to an embodiment of this application. The application data migration method is described by using an example in which a network device is the server 2 in FIG. 5, and relates to interaction of the terminal device, the AN device 1, the AN device 2, the CP function entity, the UP function entity 1, the UP function entity 2, the server 1, and the server 2 in FIG. 5, and includes the following steps.

Step S1001 to step S1005 are the same as step S901 to step S905. For details, refer to the embodiment shown in FIG. 9A, FIG. 9B and FIG. 9C, and the details are not described herein again.

S1006. The server 2 determines a second parameter.

Because the connection 2 between the terminal device and the server 2 has been established, the server 2 may detect the second parameter. For a specific detection manner, refer to an existing implementation, and details are not described herein.

Step S1007 to step S1021 are the same as step S906 to step S920. For details, refer to the embodiment shown in FIG. 9A, FIG. 9B and FIG. 9C, and the details are not described herein again.

A difference between this embodiment and the embodiment shown in FIG. 9A, FIG. 9B and FIG. 9C lies in that, the second parameter is determined by the server 2 in the embodiment shown in FIG. 10A, FIG. 10B, and FIG. 10C, while a pre-configured second parameter is obtained by the server 2 in the embodiment shown in FIG. 9A, FIG. 9B and FIG. 9C. For beneficial effects, refer to the embodiment shown in FIG. 9A, FIG. 9B and FIG. 9C, and details are not described herein again.

Figure 11A:
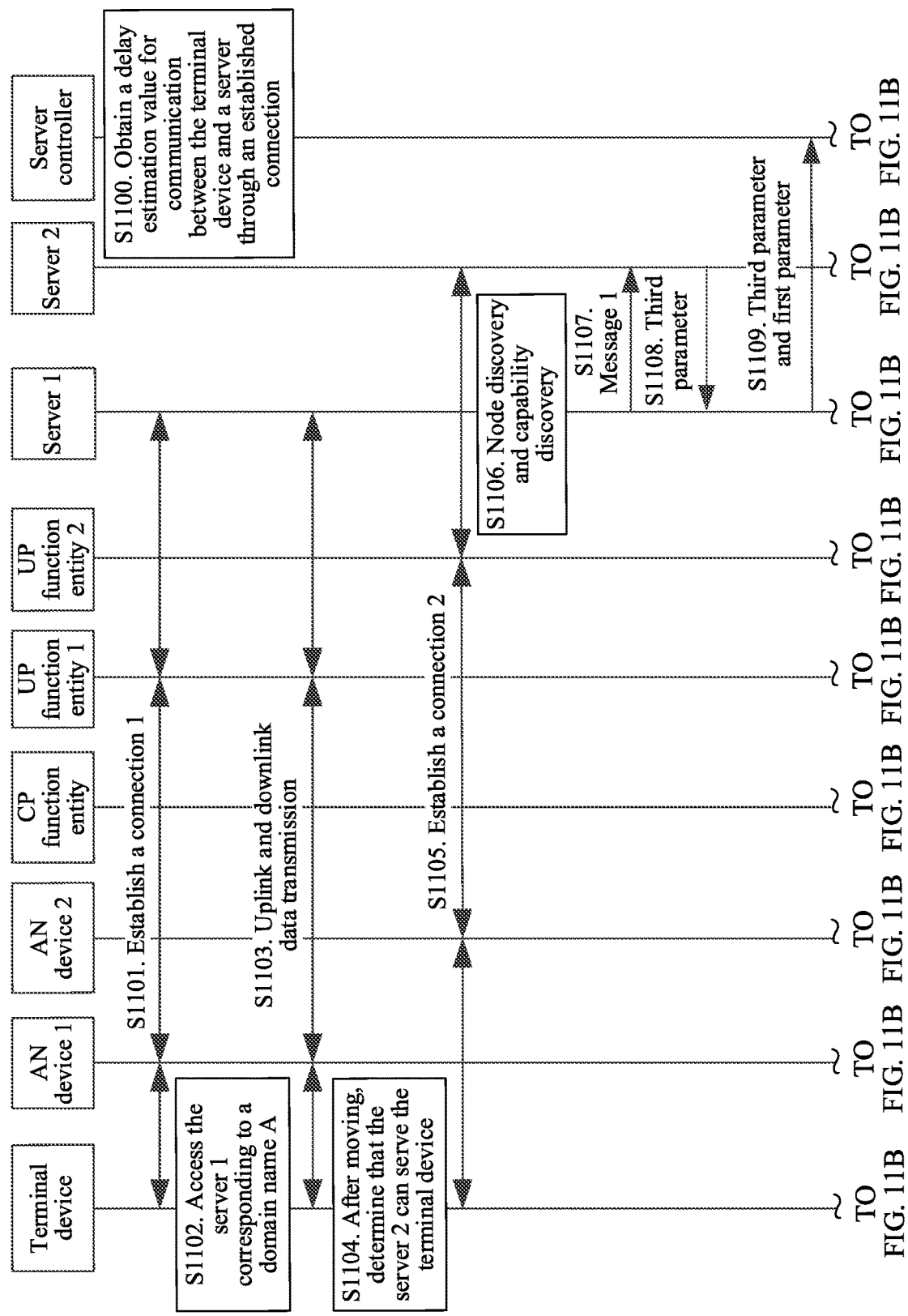
FIG. 11A, FIG. 11B, and FIG. 11C are a schematic interaction diagram 5 of an application data migration method according to an embodiment of this application.
Figure 11B:
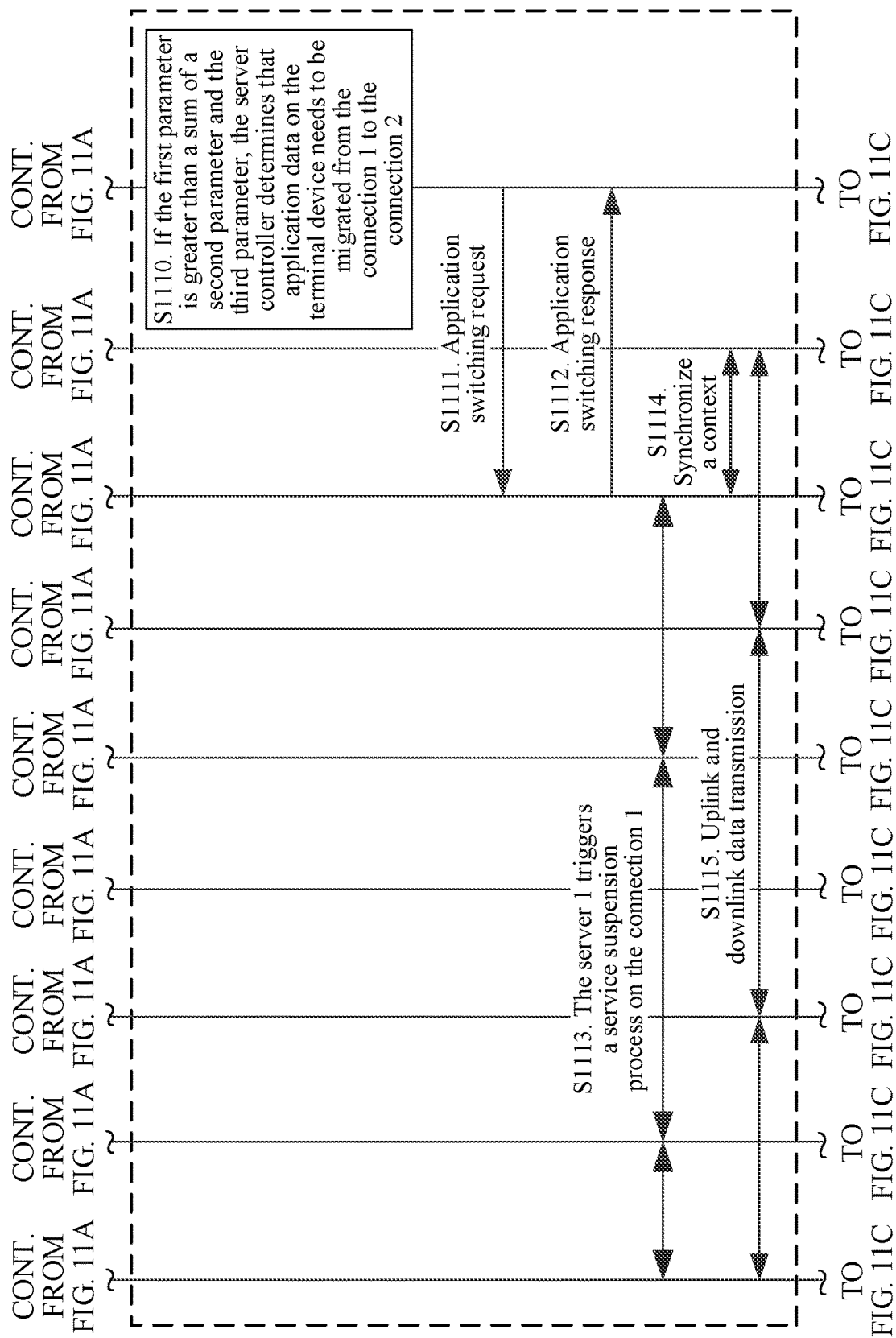
Figure 11C:
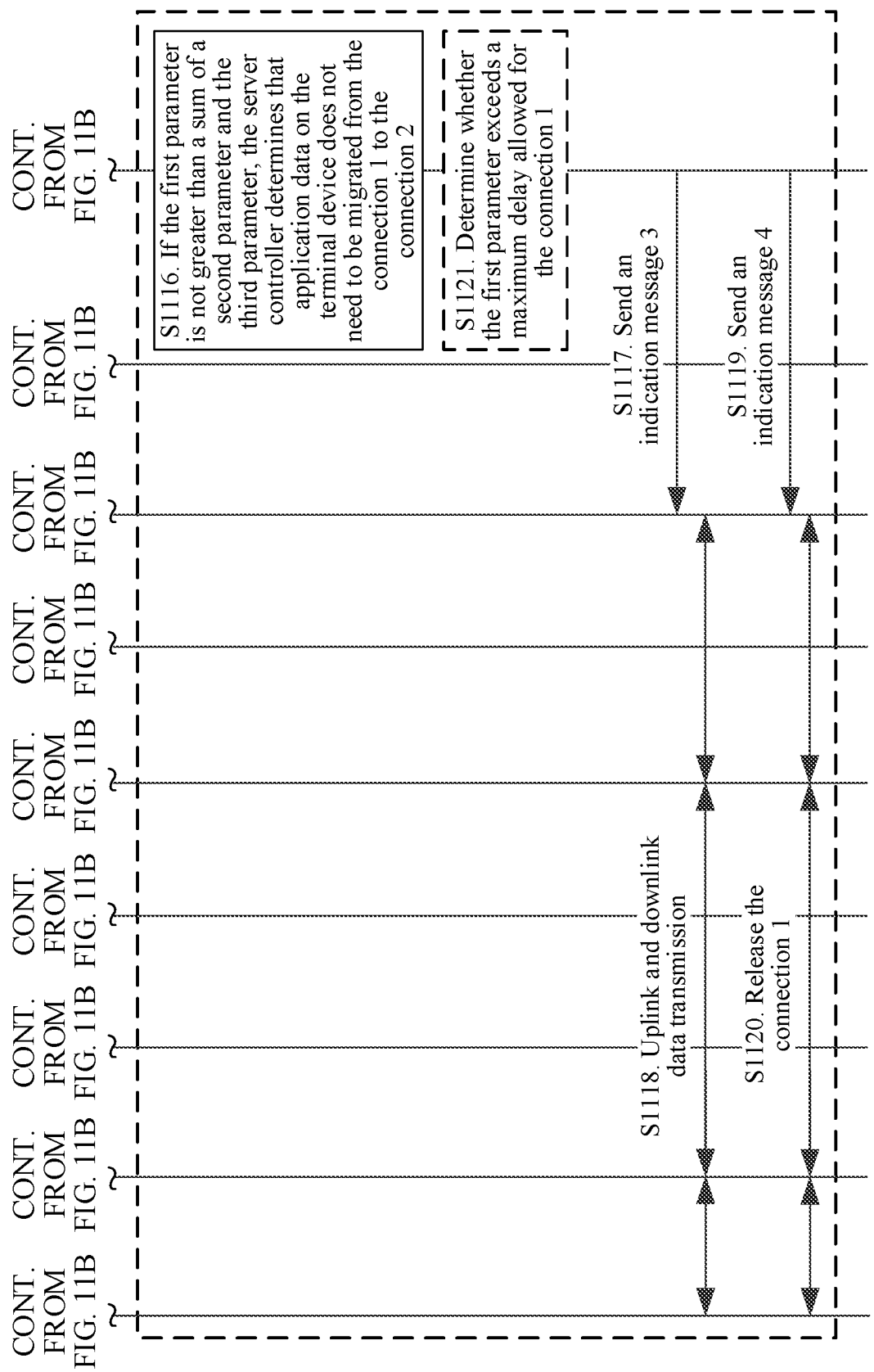

In one embodiment, FIG. 11A, FIG. 11B, and FIG. 11C are a schematic flowchart of an application data migration method according to an embodiment of this application. The application data migration method is described by using an example in which a network device is the server controller in FIG. 5, relates to interaction of the terminal device, the AN device 1, the AN device 2, the CP function entity, the UP function entity 1, the UP function entity 2, the server 1, and the server 2 in FIG. 5, and includes the following steps.

S1100. The server controller obtains a delay estimation value for communication between the terminal device and a server through an established connection, where the server herein may include the server 2. In one embodiment, the server may further include the server 1.

The delay estimation value may be an average value of a plurality of empirical values. For example, the plurality of empirical values include at least one of the following: a delay in communication between the terminal device and the server 1 through a connection 1 after the terminal device establishes the connection 1 to the server 1, a delay in communication between the terminal device and the server 2 through a connection 2 after the terminal device establishes the connection 2 to the server 2, . . . , and a delay in communication between the terminal device and a server n through a connection n after the terminal device establishes the connection n to the server n.

In one embodiment, the server controller may obtain the plurality of empirical values, calculate the average value of the plurality of empirical values, and determine the average value as the delay estimation value for communication between the terminal device and the server.

Step S1101 to step S1108 are the same as step S701 to step S708. For details, refer to the embodiment shown in FIG. 7A and FIG. 7B, and the details are not described herein again.

S1109. The server 1 sends the third parameter and a first parameter to the server controller, so that the server controller receives the third parameter and the first parameter from the server 1.

Because the connection 1 between the terminal device and the server 1 has been established, the server 1 may detect the first parameter, and then send the first parameter to the server controller. For a specific detection manner, refer to an existing implementation, and details are not described herein.

In one embodiment, if the server in step S1100 may further include the server 1, the server 1 may not need to send the first parameter to the server controller, and instead, the server controller may use the delay estimation value for communication between the terminal device and the server through the established connection as the first parameter. This is not specifically limited in this embodiment of this application.

It should be noted that step S1100 and step S1101 to step S1109 may not be necessarily performed in order. Step S1100 may be first performed, and then any one of step S1101 to step S1109 is performed; or any one of step S1101 to step S1109 may be first performed, and then step S1100 is performed. This is not specifically limited in this embodiment of this application.

S1110. If the first parameter is greater than a sum of a second parameter and the third parameter, the server controller determines that application data on the terminal device needs to be migrated from the connection 1 to the connection 2.

The server in step S1100 includes the server 2. Therefore, in this embodiment of this application, the delay estimation value that is of communication between the terminal device and the server through the established connection and that is obtained by the server controller in step S1100 may be used as the second parameter.

S1111. The server controller sends an application switching request to the server 1.

S1112. The server 1 sends an application switching response to the server controller.

S1113. The server 1 triggers a service suspension process on the connection 1.

S1114. Synchronize a context between the server 1 and the server 2.

S1115. The terminal device communicates, for example, performs uplink and downlink data transmission with the server 2 by using the AN device 2 and the UP function entity 2.

S1116. If the first parameter is not greater than a sum of a second parameter and the third parameter, the server controller determines that application data on the terminal device does not need to be migrated from the connection 1 to the connection 2.

Further, the server 1 may perform step S1117 to S1118 or step S1119 to S1120.

S1117. The server controller sends an indication message 3 to the server 1, where the indication message 3 is used to instruct the server 1 to transmit the application data through the connection 1.

S1118. The server 1 transmits the application data through the connection 1 according to the indication message 3.

S1119. The server controller sends an indication message 4 to the server 1, where the indication message 4 is used to instruct the server 1 to release the connection 1 between the terminal device and the UP function entity 1.

S1120. The server 1 releases the connection 1 according to the indication message 4.

In one embodiment, as shown in FIG. 11A, FIG. 11B, and FIG. 11C, after step S1116 and before step S1117 or step S1119, the method may further include the following step:

S1120. The server controller determines whether the first parameter exceeds a maximum delay allowed for the connection 1.

If the first parameter does not exceed the maximum delay allowed for the connection 1, step S1117 is performed; or if the first parameter exceeds the maximum delay allowed for the connection 1, step S1119 is performed.

Because the server controller sends the indication message 3 to the server 1 only when it is determined that the first parameter does not exceed the maximum delay allowed for the connection 1, and the indication message 3 is used to instruct the server 1 to transmit the application data through the connection 1, thereby avoiding a problem that the application data fails to be transmitted because the first parameter exceeds the maximum delay allowed for the connection 1, and improving transmission reliability of the application data.

Certainly, if the first parameter exceeds the maximum delay allowed for the connection 1, the server controller further instructs the server 1 to instruct the terminal device or the CP function entity to release a PDU session between the terminal device and the UP function entity 1. This is not specifically limited in this embodiment of this application.

In one embodiment, after the connection 1 is released, the terminal device may further establish a new connection to transmit the application data. This is not specifically limited in this embodiment of this application.

Alternatively, in one embodiment, after step S1116, the method includes: the server controller notifies the server 1 not to migrate the application data on the terminal device from the connection 1 to the connection 2, and the server 1 determines whether the first parameter exceeds the maximum delay allowed for the connection 1; and if the first parameter exceeds the maximum delay allowed for the connection 1, the server 1 releases the connection 1; or if the first parameter does not exceed the maximum delay allowed for the connection 1, the server 1 transmits the application data through the connection 1.

A difference between this embodiment and the embodiment shown in FIG. 7A and FIG. 7B lies in that, migration determining is performed by the server controller in the embodiment shown in FIG. 11A, FIG. 11B, and FIG. 11C, while the migration determining is performed by the server 1 in the embodiment shown in FIG. 7A and FIG. 7B.

In the application data migration method provided in this embodiment of this application, the migration determining is performed by the server controller. During the migration determining, the determining is performed based on the delay in communication between the terminal device and the server 1 through the connection 1, the delay in communication between the terminal device and the server 2 through the connection 2, and a time for synchronizing a context between the server 1 and the server 2; and when the delay in communication between the terminal device and the server 1 through the connection 1 is greater than a sum of the delay in communication between the terminal device and the server 2 through the connection 2 and the time for synchronizing the context between the server 1 and the server 2, it is determined that the application data on the terminal device needs to be migrated from the connection 1 to the connection 2; otherwise, it is determined that the application data does not need to be migrated from the connection 1 to the connection 2. Therefore, after the terminal device moves, an optimal communication path is provided for original application data, thereby saving network resources and improving communication efficiency.

Figure 12A:
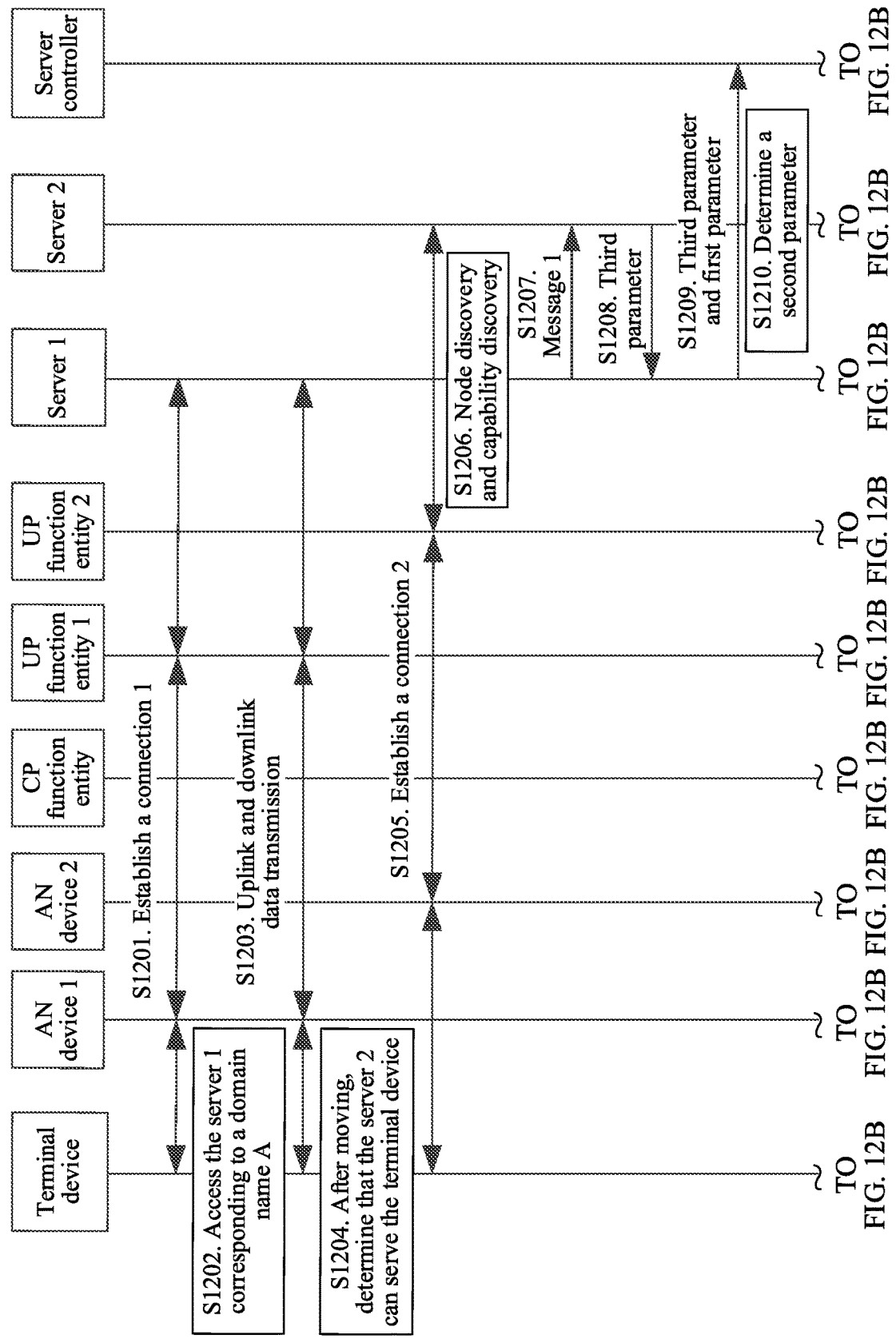
Figure 12C:
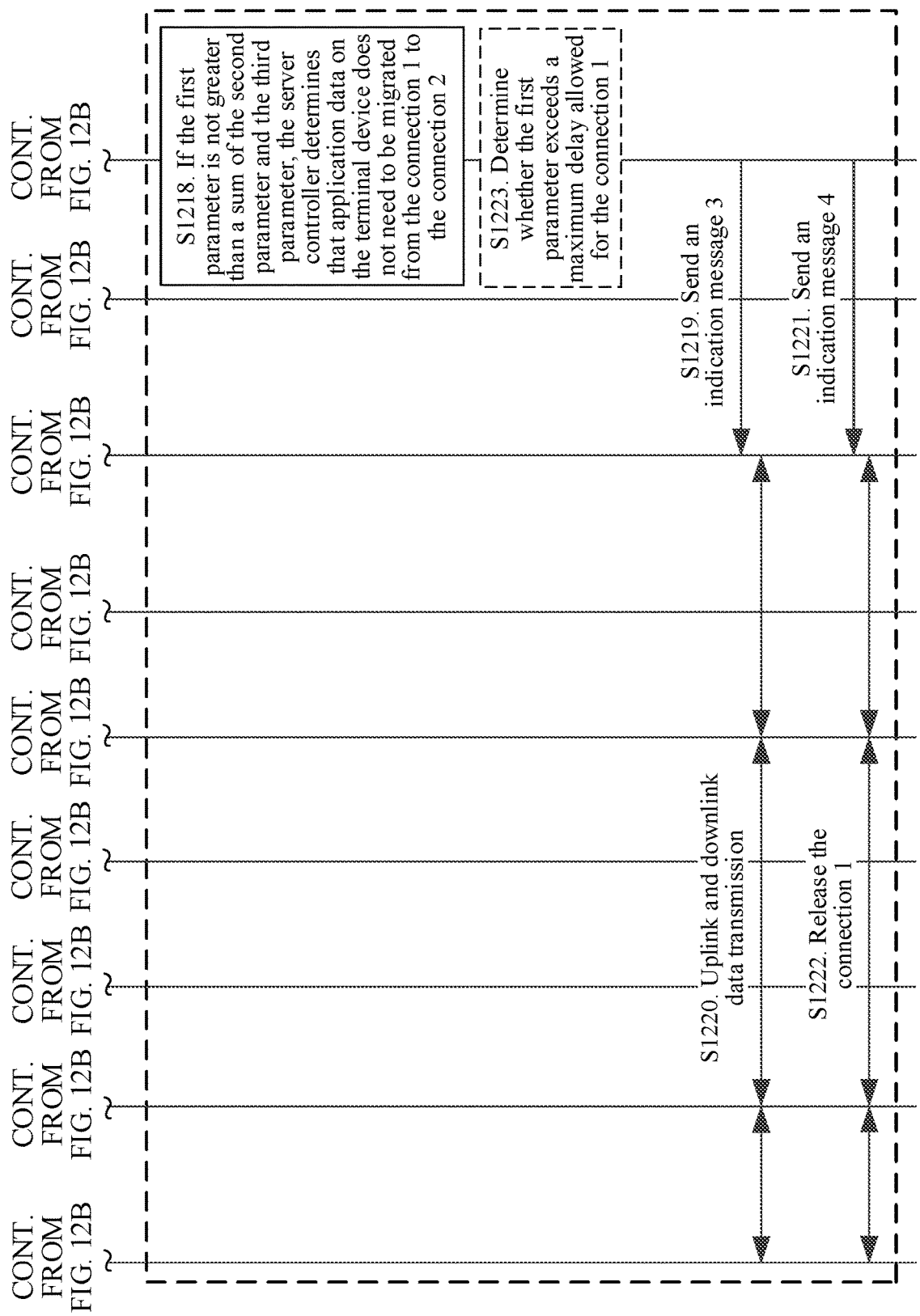

In one embodiment, FIG. 12A, FIG. 12B, and FIG. 12C are a schematic flowchart of an application data migration method according to an embodiment of this application. The application data migration method is described by using an example in which a network device is the server controller in FIG. 5, relates to interaction of the terminal device, the AN device 1, the AN device 2, the CP function entity, the UP function entity 1, the UP function entity 2, the server 1, and the server 2 in FIG. 5, and includes the following steps.

Step S1201 to step S1209 are the same as step S1101 to step S1109. For details, refer to the embodiment shown in FIG. 11A, FIG. 11B, and FIG. 11C, and the details are not described herein again.

S1210. The server 2 determines a second parameter.

Because the connection 2 between the terminal device and the server 2 has been established, the server 2 may detect the second parameter. For a specific detection manner, refer to an existing implementation, and details are not described herein.

S1211. The server 2 sends the second parameter to the server controller, so that the server controller receives the second parameter from the server 2.

Step S1212 to step S1223 are the same as step S1110 to step S1121. For details, refer to the embodiment shown in FIG. 11A, FIG. 11B, and FIG. 11C, and the details are not described herein again.

A difference between this embodiment and the embodiment shown in FIG. 11A, FIG. 11B, and FIG. 11C lies in that, the second parameter is received by the server controller from the server 2 in the embodiment shown in FIG. 12A, FIG. 12B and FIG. 12C, but a pre-configured second parameter is obtained by the server controller in the embodiment shown in FIG. 11A, FIG. 11B, and FIG. 11C. For beneficial effects, refer to the embodiment shown in FIG. 11A, FIG. 11B, and FIG. 11C, and details are not described herein again.

The foregoing mainly describes the solutions provided in this embodiment of this application from a perspective of interaction between network elements. It may be understood that, to achieve the foregoing functions, the network device includes a corresponding hardware structure and/or software module for implementing each function. A person skilled in the art should be easily aware that, in combination with units and algorithm steps in the examples described in the embodiments disclosed in this specification, this application can be implemented by hardware or a combination of hardware and computer software. Whether a function is performed by hardware or hardware driven by computer software depends on particular applications and design constraints of the technical solutions. The person skilled in the art may use different methods to implement the described functions for each particular application, but it should not be considered that such implementation goes beyond the scope of this application.

In the embodiments of the present invention, functional modules of the network device may be divided according to the foregoing method examples. For example, the functional modules may be divided according to functions, or two or more functions may be integrated into one processing module. The integrated module may be implemented in a form of hardware, or may be implemented in a form of a software functional module. It should be noted that the module division in the embodiments of this application is an example, and is merely logical function division. In an actual implementation, another division manner may exist.

Figure 13:
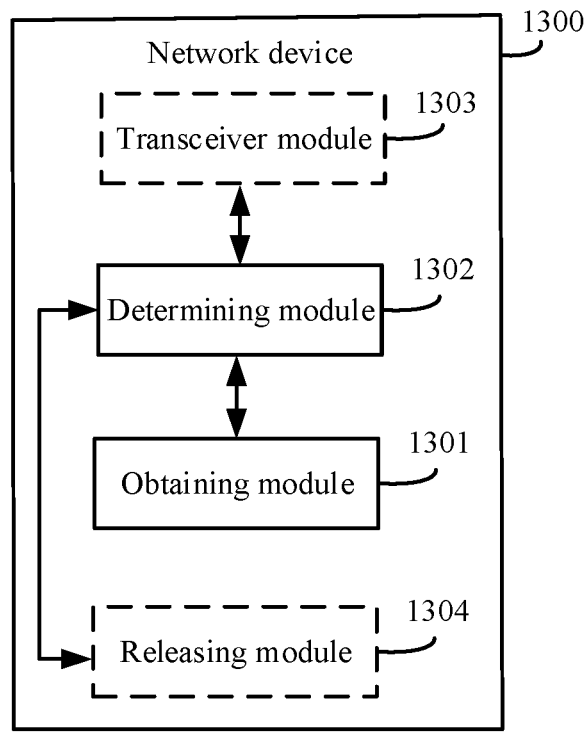
FIG. 13 is a schematic structural diagram 1 of a network device according to an embodiment of this application.

For example, when functional modules are divided according to functions, FIG. 13 is a schematic diagram of a possible structure of the network device 130 in the foregoing embodiments. The network device 130 includes an obtaining module 1301 and a determining module 1302.

The obtaining module 1301 is configured to obtain a first parameter, a second parameter, and a third parameter, where the first parameter includes a delay in communication between a terminal device and a first server through a first connection, the second parameter includes a delay in communication between the terminal device and a second server through a second connection, and the third parameter includes a time for synchronizing a context between the first server and the second server.

The determining module 1302 is configured to: if the first parameter is greater than a sum of the second parameter and the third parameter, determine that application data on the terminal device needs to be migrated from the first connection to the second connection.

The determining module 1302 is further configured to: if the first parameter is not greater than a sum of the second parameter and the third parameter, determine that application data does not need to be migrated from the first connection to the second connection.

In one embodiment, the network device 130 is the first server. In this case, the obtaining module 1301 is configured to receive the third parameter from the second server.

In one embodiment, the obtaining module 1301 is further configured to: obtain a delay estimation value for communication between the terminal device and a server through an established connection, and determine the delay estimation value as the second parameter; or receive the second parameter from the terminal device.

In one embodiment, the network device 130 is the second server. In this case, the obtaining module 1301 is configured to receive the third parameter from the first server.

In one embodiment, the obtaining module 1301 is further configured to: obtain a delay estimation value for communication between the terminal device and a server through an established connection, and determine the delay estimation value as the second parameter; or determine the second parameter.

In one embodiment, the network device 130 is a server controller. In this case, the obtaining module 1301 is configured to receive the third parameter from the first server or the second server.

In one embodiment, the obtaining module 1301 is further configured to: obtain a delay estimation value for communication between the terminal device and a server through an established connection, and determine the delay estimation value as the second parameter; or receive the second parameter from the second server.

In one embodiment, as shown in FIG. 13, the network device 130 further includes a transceiver module 1303. The transceiver module 1303 is configured to: if the determining module 1302 determines that the application data needs to be migrated from the first connection to the second connection, send a handover indication message to the first server, where the handover indication message is used to instruct the first server to migrate the application data from the first connection to the second connection.

In one embodiment, the determining module 1302 is further configured to determine that the first parameter exceeds a preset value.

In one embodiment, as shown in FIG. 13, the network device 130 further includes a transceiver module 1303. The transceiver module 1303 is configured to: if the determining module 1302 determines that the application data does not need to be migrated from the first connection to the second connection, transmit the application data through the first connection.

Alternatively, in one embodiment, as shown in FIG. 13, the network device 130 further includes a releasing module 1304. The releasing module 1304 is configured to release the first connection.

In an example, when the network device 130 is the first server, the obtaining module 1301 is configured to support the first server in performing steps S700 and S708 in FIG. 7A; the determining module 1302 is configured to support the first server in performing steps S709, S713, and S716 in FIG. 7B; the transceiver module 1303 is configured to support the first server in performing steps S703, S707, S711, and S714 in FIG. 7A and FIG. 7B; and the releasing module 1304 is configured to support the first server in performing step S715 in FIG. 7B.

Alternatively, for example, when the network device 130 is the first server, the obtaining module 1301 is configured to support the first server in performing steps S809 and S812 in FIG. 8A; the determining module 1302 is configured to support the first server in performing steps S804, S805, S813, S817, and S820 in FIG. 8A and FIG. 8B; the transceiver module 1303 is configured to support the first server in performing steps S803, S811, S815, and S818 in FIG. 8A and FIG. 8B; and the releasing module 1304 is configured to support the first server in performing step S819 in FIG. 8B.

Alternatively, for example, when the network device 130 is the second server, the obtaining module 1301 is configured to support the second server in performing steps S900 and S908 in FIG. 9A; the determining module 1302 is configured to support the second server in performing steps S909, S915, and S920 in FIG. 9B and FIG. 9C; the transceiver module 1303 is configured to support the second server in performing steps S907, S910, S911, S913, S914, and S916 in FIG. 9A, FIG. 9B and FIG. 9C; and the releasing module 1304 is configured to support the second server in performing step S918 in FIG. 9C.

Alternatively, for example, when the network device 130 is the second server, the obtaining module 1301 is configured to support the second server in performing step S1009 in FIG. 10A; the determining module 1302 is configured to support the second server in performing steps S1006, S1010, S1016, and S1021 in FIG. 10A, FIG. 10B, and FIG. 10C; the transceiver module 1303 is configured to support the second server in performing steps S1008, S1011, S1012, S1014, and S1017 in FIG. 10A, FIG. 10B, and FIG. 10C; and the releasing module 1304 is configured to support the second server in performing step S1019 in FIG. 10C.

Alternatively, for example, when the network device 130 is the server controller, the obtaining module 1301 is configured to support the server controller in performing steps S1100 and S1109 in FIG. 11A; the determining module 1302 is configured to support the server controller in performing steps S1110, S1116, and S1121 in FIG. 11B and FIG. 11C; the transceiver module 1303 is configured to support the server controller in performing steps S1111, S1112, and S1117 in FIG. 11B and FIG. 11C; and the releasing module 1304 is configured to support the server controller in performing step S1119 in FIG. 11C.

Alternatively, for example, when the network device 130 is the server controller, the obtaining module 1301 is configured to support the server controller in performing steps S1209 and S1211 in FIG. 12A and FIG. 12B; the determining module 1302 is configured to support the server controller in performing steps S1212, S1218, and S1223 in FIG. 12B and FIG. 12C; the transceiver module 1303 is configured to support the server controller in performing steps S1213, S1214, and S1219 in FIG. 12B and FIG. 12C; and the releasing module 1304 is configured to support the server controller in performing step S1221 in FIG. 12C.

All related content of the steps in the foregoing method embodiments may be cited in corresponding function descriptions of function modules. Details are not described herein again.

Figure 14:
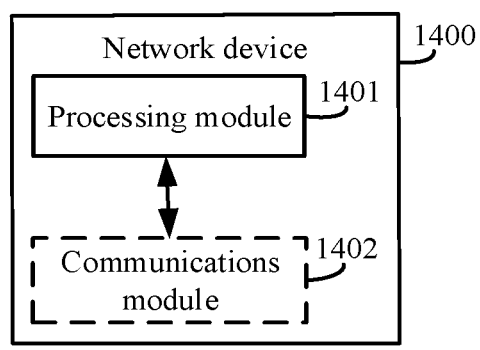
FIG. 14 is a schematic structural diagram 2 of a network device according to an embodiment of this application.

When function modules are divided in an integrated manner, FIG. 14 is a schematic diagram of a possible structure of the network device in the foregoing embodiments. As shown in FIG. 14, a network device 140 includes a processing module 1401. The processing module 1401 performs the actions of the obtaining module 1301 and the determining module 1302 in FIG. 13. In one embodiment, the processing module 1401 performs the action of the releasing module 1304 in FIG. 13. For details, refer to the embodiment shown in FIG. 13, and the details are not described herein again. In one embodiment, as shown in FIG. 14, the network device 140 further includes a communications module 1402. The communications module 1402 performs the action of the transceiver module 1303 in FIG. 13. For details, refer to the embodiment shown in FIG. 13, and the details are not described herein again.

All related content of the steps in the foregoing method embodiments may be cited in corresponding function descriptions of function modules. Details are not described herein again.

In this embodiment, the network device is presented in a form in which functional modules are divided according to functions, or the network device is presented in a form in which functional modules are divided in an integrated manner. The "module" herein may be a specific ASIC, a circuit, a processor executing one or more software or firmware programs and a memory, an integrated logic circuit, and/or another device that can provide the foregoing function. In a simple embodiment, a person skilled in the art may figure out that the network device 130 or the network device 140 may be in a form shown in FIG. 15.

Figure 15:
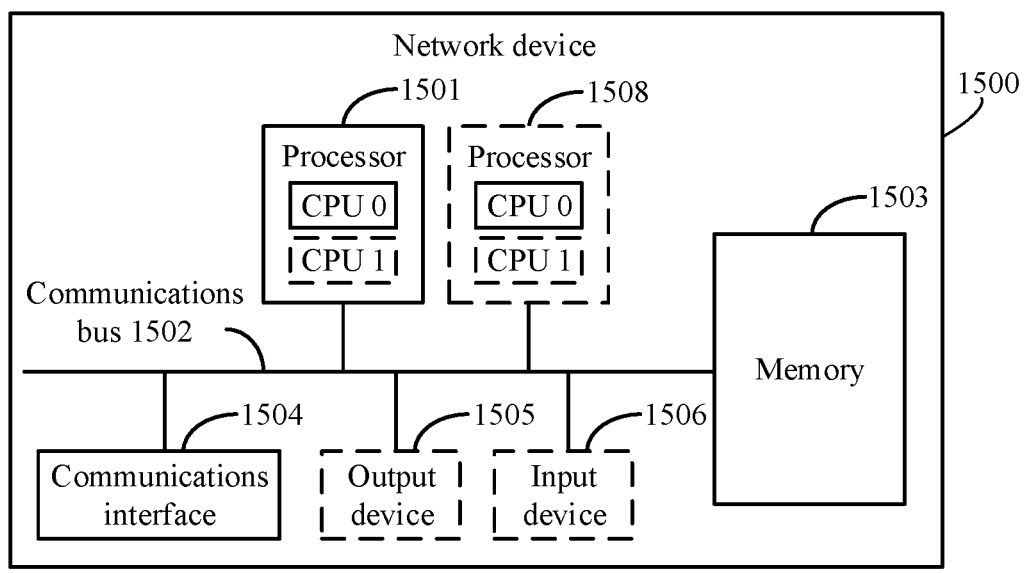
FIG. 15 is a schematic structural diagram 3 of a network device according to an embodiment of this application.

FIG. 15 is a schematic diagram of a hardware structure of a network device 1500 according to an embodiment of this application. The network device 1500 includes a processor 1501, a communications bus 1502, and a communications interface 1504.

The processor 1501 may be a general purpose processor, for example, a central processing unit (CPU), a network processor (NP), or a combination of a CPU and an NP. The processor 1501 may also be a microprocessor (MCU), an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. For example, in this embodiment of this application, the processor 1501 may be an STM32F1505 chip, and is configured to run, encrypt, and decrypt a 6LoWPAN protocol.

The communications bus 1502 may include a path to transmit information between the foregoing components.

The communications interface 1504 may be any apparatus such as a transceiver, and is configured to communicate with another device or a communications network. The communications interface 1504 may include an Ethernet interface, a radio access network (RAN) interface, a wireless local area network (WLAN) interface, and the like.

In one embodiment, the network device 1500 may further include a memory 1503, where the memory 1503 may further include a volatile memory, for example, a random access memory (RAM); or the memory may include a non-volatile memory, for example, a flash memory, a hard disk drive (HDD), or a solid-state drive (SSD); or the memory 1503 may include a combination of the foregoing types of memories.

In one embodiment, the memory 1503 is configured to store program code. The processor 1501 is configured to execute the program code stored in the memory 1503, to implement the application data migration method provided in the embodiments of this application.

During specific implementation, the processor 1501 may include one or more CPUs, for example, a CPU 0 and a CPU 1 in FIG. 15. The CPU may be a single-core CPU, or may be a multi-core CPU.

During specific implementation, in an embodiment, the network device 1500 may further include an output device 1505 and an input device 1506. The output device 1505 communicates with the processor 1501, and may display information in a plurality of manners. For example, the output device 1505 may be a liquid crystal display (LCD), a light emitting diode (LED) display device, a cathode ray tube (CRT) display device, a projector, or the like. The input device 1506 communicates with the processor 1501, and may accept input of a user in a plurality of manners. For example, the input device 1506 may be a mouse, a keyboard, a touchscreen device, a sensor device, or the like.

The network device 1500 may be a general-purpose node or a dedicated node. During specific implementation, the network device 1500 may be a desktop computer, a portable computer, a network server, a palmtop computer, a personal digital assistant (PDA), a mobile phone, a tablet computer, a wireless terminal device, an embedded device, or a device with a structure similar to that in FIG. 15. A type of the network device 1500 is not limited in this embodiment of this application.

For example, the obtaining module 1301, the determining module 1302, the transceiver module 1303, and the releasing module 1304 in FIG. 13 may be implemented by using the processor 1501 and the memory 1503 in FIG. 15. Specifically, the obtaining module 1301, the determining module 1302, the transceiver module 1303, and the releasing module 1304 may be executed by invoking the application program code stored in the memory 1503 by the processor 1501, which is not limited in this embodiment of this application. Alternatively, for example, the processing module 1401 and the communications module 1402 in FIG. 14 may be implemented by using the processor 1501 and the memory 1503 in FIG. 15. Specifically, the processing module 1401 and the communications module 1402 may be executed by invoking the application program code stored in the memory 1503 by the processor 1501, which is not limited in this embodiment of this application.

The network device provided in this embodiment of this application may be configured to perform the foregoing application data migration method. Therefore, for technical effects that can be achieved by the network device, refer to the foregoing method embodiments, and details are not described in this application again.

All or some of the foregoing embodiments may be implemented by using software, hardware, firmware, or any combination thereof. When a software program is used for implementation, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "an" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the accompanying claims, and are considered to cover any or all of modifications, variations, combinations, or equivalents within the scope of this application. Apparently, the person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for application data migration, comprising:
   obtaining, by a network device, a first parameter, a second parameter, and a third parameter, wherein the first parameter comprises a delay in communication between a terminal device and a first server through a first connection, the second parameter comprises a delay in communication between the terminal device and a second server through a second connection, and the third parameter comprises a time for synchronizing a context between the first server and the second server; and
   if the first parameter is greater than a sum of the second parameter and the third parameter, determining, by the network device, that application data on the terminal device needs to be migrated from the first connection to the second connection; or
   if the first parameter is not greater than the sum of the second parameter and the third parameter, determining, by the network device, that application data on the terminal device does not need to be migrated from the first connection to the second connection.

2. The method according to claim 1, wherein
the network device is the first server; and
obtaining the third parameter comprises: receiving, by the first server, the third parameter from the second server.

3. The method according to claim 2, wherein obtaining the second parameter comprises:
obtaining, by the first server, a delay estimation value for communication between the terminal device and a third server through an established connection, and determining the delay estimation value as the second parameter; or
receiving, by the first server, the second parameter from the terminal device.

4. The method according to claim 1, wherein
the network device is the second server; and
obtaining the third parameter comprises: receiving, by the second server, the third parameter from the first server.

5. The method according to claim 4, wherein obtaining the second parameter comprises:
obtaining, by the second server, a delay estimation value for communication between the terminal device and a third server through an established connection, and determining the delay estimation value as the second parameter; or
determining, by the second server, the second parameter.

6. The method according to claim 1, wherein
the network device is a server controller; and
obtaining the third parameter comprises: receiving, by the server controller, the third parameter from the first server or the second server.

7. The method according to claim 6, wherein obtaining the second parameter comprises:
obtaining, by the server controller, a delay estimation value for communication between the terminal device and a third server through an established connection, and determining the delay estimation value as the second parameter; or
receiving, by the server controller, the second parameter from the second server.

8. The method according to claim 4, further comprising:
if the network device determines that the application data needs to be migrated from the first connection to the second connection,
sending, by the network device, a handover indication message to the first server, wherein the handover indication message is used to instruct the first server to migrate the application data from the first connection to the second connection.

9. The method according to claim 1, further comprising:
determining, by the network device, that the first parameter exceeds a preset value.

10. The method according to claim 1, further comprising:
if the network device determines that the application data does not need to be migrated from the first connection to the second connection,
transmitting, by the network device, the application data through the first connection; or
releasing, by the network device, the first connection.

11. A network device, comprising:
an interface;
a processor; and
a non-transitory computer-readable storage medium storing a program to be executed by the processor, the program including instructions to:
obtain a first parameter, a second parameter, and a third parameter, wherein the first parameter comprises a delay in communication between a terminal device and a first server through a first connection, the second parameter comprises a delay in communication between the terminal device and a second server through a second connection, and the third parameter comprises a time for synchronizing a context between the first server and the second server;
if the first parameter is greater than a sum of the second parameter and the third parameter, determine that application data on the terminal device needs to be migrated from the first connection to the second connection; and
if the first parameter is not greater than the sum of the second parameter and the third parameter, determine that application data on the terminal device does not need to be migrated from the first connection to the second connection.

12. The network device according to claim 11, wherein
the network device is the first server; and
to obtain the third parameter, the program includes instructions to receive the third parameter from the second server.

13. The network device according to claim 12, wherein the program includes instructions to obtain a delay estimation value for communication between the terminal device and a third server through an established connection, and determine the delay estimation value as the second parameter; or receive the second parameter from the terminal device.

14. The network device according to claim 11, wherein
the network device is the second server; and
the program includes instructions to receive the third parameter from the first server.

15. The network device according to claim 14, wherein to obtain the second parameter, the program includes instructions to obtain a delay estimation value for communication between the terminal device and a third server through an established connection, and determine the delay estimation value as the second parameter; or determine the second parameter.

16. The network device according to claim 11, wherein
the network device is a server controller; and
to obtain the third parameter, the program includes instructions to receive the third parameter from the first server or the second server.

17. The network device according to claim 16, wherein to obtain the second parameter, the program includes instructions to obtain a delay estimation value for communication between the terminal device and a server through an established connection, and determine the delay estimation value as the second parameter; or receive the second parameter from the second server.

18. The network device according to claim 14, wherein the program includes instructions to: upon determining that the application data needs to be migrated from the first connection to the second connection, send a handover indication message to the first server, wherein the handover indication message is used to instruct the first server to migrate the application data from the first connection to the second connection.

19. The network device according to claim 11, wherein the program includes instructions to determine that the first parameter exceeds a preset value.

20. The network device according to claim 11, wherein the program includes instructions to: upon determining that the application data does not need to be migrated from the first connection to the second connection, transmit the application data through the first connection; or
release the first connection.

* * * * *